United States Patent
Matsumura et al.

(10) Patent No.: US 10,438,718 B2
(45) Date of Patent: Oct. 8, 2019

(54) HEAT-RESISTANT SILANE CROSSLINKED RESIN MOLDED BODY AND METHOD OF PRODUCING THE SAME, HEAT-RESISTANT SILANE CROSSLINKABLE RESIN COMPOSITION AND METHOD OF PRODUCING THE SAME, SILANE MASTER BATCH, AND HEAT-RESISTANT PRODUCT USING HEAT-RESISTANT SILANE CROSSLINKED RESIN MOLDED BODY

(71) Applicant: FURUKAWA ELECTRIC CO., LTD., Tokyo (JP)

(72) Inventors: Arifumi Matsumura, Tokyo (JP); Masaki Nishiguchi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/081,503

(22) Filed: Mar. 25, 2016

(65) Prior Publication Data

US 2016/0211050 A1    Jul. 21, 2016

Related U.S. Application Data

(63) Continuation of application No. PCT/JP2014/075752, filed on Sep. 26, 2014.

(30) Foreign Application Priority Data

Sep. 27, 2013  (JP) .................................. 2013-202670

(51) Int. Cl.

| | |
|---|---|
| H01B 3/44 | (2006.01) |
| C08J 3/22 | (2006.01) |
| C08J 3/24 | (2006.01) |
| H01B 3/22 | (2006.01) |
| H01B 3/28 | (2006.01) |
| C08K 5/5425 | (2006.01) |
| C09K 21/14 | (2006.01) |
| H01B 7/29 | (2006.01) |
| C08L 23/06 | (2006.01) |
| C08L 23/08 | (2006.01) |
| C08K 5/14 | (2006.01) |
| C08K 5/54 | (2006.01) |
| C08L 91/00 | (2006.01) |

(52) U.S. Cl.
CPC ................ H01B 3/442 (2013.01); C08J 3/22 (2013.01); C08J 3/226 (2013.01); C08J 3/24 (2013.01); C08K 5/14 (2013.01); C08K 5/54 (2013.01); C08K 5/5425 (2013.01); C08L 23/06 (2013.01); C08L 23/0815 (2013.01); C08L 91/00 (2013.01); C09K 21/14 (2013.01); H01B 3/22 (2013.01); H01B 3/28 (2013.01); H01B 3/441 (2013.01); H01B 7/292 (2013.01); C08J 2323/08 (2013.01); C08J 2325/04 (2013.01); C08J 2325/08 (2013.01); C08J 2423/16 (2013.01)

(58) Field of Classification Search
CPC ................................ C08L 101/10; C08K 5/14
See application file for complete search history.

(56) References Cited

U.S. PATENT DOCUMENTS

| 4,376,184 A * | 3/1983 | Itoh ...................... C08K 5/3415 524/492 |
| 2010/0163272 A1 | 7/2010 | Inagaki et al. |
| 2014/0227518 A1* | 8/2014 | Kishimoto ............... C08L 23/04 428/394 |

FOREIGN PATENT DOCUMENTS

| EP | 2927268 A1 | 10/2015 |
| JP | 2000-143935 A | 5/2000 |
| JP | 2000-315424 A | 11/2000 |
| JP | 2001-101928 A | 4/2001 |
| JP | 2001-240719 A | 9/2001 |
| JP | 2012 255077 | * 12/2012 |
| JP | 2012-255077 A | 12/2012 |
| WO | WO 2012/136775 A1 | 10/2012 |
| WO | WO 2012/169298 A1 | 12/2012 |
| WO | WO 2013/147148 A1 | 10/2013 |
| WO | WO 2014/084048 A1 | 6/2014 |

OTHER PUBLICATIONS

International Search Report for PCT/JP2014/075752 dated Dec. 9, 2014.
Written Opinion of the International Searching Authority for PCT/JP2014/075752 (PCT/ISA/237) dated Dec. 9, 2014.
Extended European Search Report for European Application No. 14848078.3, dated Apr. 21, 2017.

* cited by examiner

*Primary Examiner* — Kuo Liang Peng
(74) *Attorney, Agent, or Firm* — Birch, Stewart, Kolasch & Birch, LLP

(57) ABSTRACT

A method comprising at least a step of preparing a silane master batch by melt-kneading a base resin ($R_B$) containing a non-aromatic organic oil, an organic peroxide, an inorganic filler, and a silane coupling agent, in specific mass ratio, and a step of mixing the silane master batch and a silanol condensation catalyst or a silane master batch; a heat-resistant silane crosslinked resin molded body and a heat-resistant silane crosslinkable resin composition prepared by the method, and a silane master batch and a heat-resistant product.

9 Claims, No Drawings

HEAT-RESISTANT SILANE CROSSLINKED RESIN MOLDED BODY AND METHOD OF PRODUCING THE SAME, HEAT-RESISTANT SILANE CROSSLINKABLE RESIN COMPOSITION AND METHOD OF PRODUCING THE SAME, SILANE MASTER BATCH, AND HEAT-RESISTANT PRODUCT USING HEAT-RESISTANT SILANE CROSSLINKED RESIN MOLDED BODY

CROSS-REFERENCE TO RELATED APPLICATIONS

This application is a Continuation of PCT International Application No. PCT/JP2014/075752 filed on Sep. 26, 2014, which claims priority under 35 U.S.C. § 119 (a) to Japanese Patent Application No. 2013-202670 filed in Japan on Sep. 27, 2013. Each of the above applications is hereby expressly incorporated by reference, in its entirety, into the present application.

TECHNICAL FIELD

The present invention relates to a heat-resistant silane crosslinked resin molded body and a method of producing the same, a heat-resistant silane crosslinkable resin composition and a method of producing the same, a silane master batch, and a heat-resistant product using a heat-resistant silane crosslinked resin molded body.

More specifically, the present invention relates to a heat-resistant silane crosslinked resin molded body that is excellent in appearance even when the body is produced under conditions in which an aggregated substance is easily generated, and preferably also has excellent mechanical characteristics and flame retardancy, and a method of producing the same, a silane master batch and a heat-resistant silane crosslinkable resin composition capable of being formed into the heat-resistant silane crosslinked resin molded body, and a method of producing the same, and a heat-resistant product in which the heat-resistant silane crosslinked resin molded body is used as an insulator, a sheath or the like of an electric wire.

BACKGROUND ART

Insulated wires, cables, cords, optical fiber core wires, used as inside or outside wiring for electric and electronic instruments, optical fiber cord and the like, are required to have various properties such as flame retardancy, heat resistance, and mechanical characteristics (for example, tensile properties and abrasion resistance).

As the materials for these wiring materials, use is made of resin compositions prepared by incorporating the metal hydrate such as magnesium hydroxide or aluminum hydroxide in large quantities.

In addition, the temperatures of the wiring materials used for electric or electronic instruments may rise to from 80 to 105° C., even to about 125° C., under continuous use, so that heat resistance is required in some applications. In such a case, high heat resistance is imparted to the wiring materials by applying a method of crosslinking a coating material by electron beam crosslinking or chemical crosslinking.

So far, as a method of crosslinking a polyolefin resin such as polyethylene, or rubber such as ethylene-propylene rubber or chloroprene rubber, an electron beam crosslinking method of irradiating with electron beams to cause bridging (also referred to as crosslinking), a chemical crosslinking method of applying heat, after molding, to decompose organic peroxide or the like to allow a crosslinking reaction, and a silane crosslinking method have been known.

Among these crosslinking methods, because in most cases silane crosslinking methods do not particularly require special facilities, they can therefore be used in a wide variety of fields.

The silane crosslinking method is a method of obtaining a crosslinked molded body, by a grafting reaction of a silane coupling agent having an unsaturated group onto a polymer in the presence of organic peroxides, to obtain a silane graft polymer, and then contacting the silane graft polymer with water in the presence of a silanol condensation catalyst.

To give a concrete example, as a method of producing a halogen-free heat-resistant silane crosslinked resin, there is a method of melt-blending a silane master batch prepared by grafting a hydrolyzable silane coupling agent having an unsaturated group onto a polyolefin resin, a heat-resistant master batch prepared by kneading a polyolefin resin and an inorganic filler, and a catalyst master batch containing a silanol condensation catalyst.

However, in this method, when the inorganic filler exceeds 100 parts by mass with respect to 100 parts by mass of the polyolefin resin, it becomes difficult to conduct uniform melt-kneading thereof in a single-screw extruder or a twin-screw extruder, after the silane master batch and the heat-resistant master batch are dry mixed. This causes problems such as deterioration of appearance, significant degeneration of physical properties, and difficulty of molding with high extrusion load.

Accordingly, in performing dry blending of the silane master batch with the heat-resistant master batch, and then uniformly melt-kneading them, a ratio of the inorganic filler is restricted, as mentioned above. Therefore, it has been difficult to achieve high flame retardancy and high heat resistance.

Generally, for the kneading in the case where the inorganic filler exceeds 100 parts by mass with respect to 100 parts by mass of polyolefin resin, an enclosed mixer such as a continuous kneader, a pressurized kneader, or a Banbury mixer is generally used.

In the meantime, when a silane grafting reaction is performed in a kneader or a Banbury mixer, the hydrolyzable silane coupling agent having an unsaturated group, which generally has high volatility, volatizes before grafting reaction. Therefore, it was very difficult to prepare a desired silane crosslinking master batch.

Therefore, in the case of preparing a heat-resistant silane master batch with a Banbury mixer or a kneader, consideration might be given to a method which includes adding organic peroxides and a silane coupling agent having a hydrolysable unsaturated group to the heat-resistant master batch prepared by melt-blending a polyolefin resin and an inorganic filler, and then subjecting the resultant to graft-reaction in a single-screw extruder.

However, according to such a method, defects in the appearance of molded body would sometimes occur due to uneven reaction. Further, the need to incorporate a very large amount of inorganic filler in the master batch would sometimes result in very high extrusion load. These make it very difficult to manufacture a molded body. As a result, it was difficult to obtain a desired material or molded body. In addition, the method involves two steps and therefore has a big problem in terms of cost.

Patent Literature 1 proposes a method in which an inorganic filler surface-treated with a silane coupling agent, a silane coupling agent, an organic peroxide, and a crosslinking catalyst are thoroughly melt-kneaded with a kneader into a resin component formed by mixing a polyolefin-based resin and a maleic anhydride-based resin, and then the blend is molded with a single-screw extruder.

In addition, Patent Literatures 2 to 4 propose a method of partially crosslinking a vinyl aromatic thermoplastic elastomer composition prepared by adding a non-aromatic softener for rubber as a softener, to a block copolymer or the like as a base resin, through a silane surface-treated inorganic filler using organic peroxide.

Further, Patent Literature 5 proposes a method in which organic peroxide, a silane coupling agent, and a metal hydrate are melt-kneaded with a base material in batch, and further melt-molded together with a silanol condensation catalyst, and then crosslinked in the presence of water, to easily obtain a cable having heat resistance.

CITATION LIST

Patent Literatures

Patent Literature 1: JP-A-2001-101928 ("JP-A" means unexamined published Japanese patent application)
Patent Literature 2: JP-A-2000-143935
Patent Literature 3: JP-A-2000-315424
Patent Literature 4: JP-A-2001-240719
Patent Literature 5: JP-A-2012-255077

SUMMARY OF INVENTION

Technical Problem

However, according to the method described in Patent Literature 1, a resin is partially crosslinked during melt-kneading in a Banbury mixer or a kneader, and it is liable to cause poor appearance (formation of a number of granule-like matters protruded on a surface thereof) of a molded body to be obtained. Further, a greater part of silane coupling agent other than the silane coupling agents with which the inorganic filler is surface-treated, is liable to be volatilized or condensed. For this reason, the desired heat resistance cannot be obtained and, in addition, the appearance of electric wire can be degraded by condensation of the silane coupling agents.

In addition, even according to the methods proposed in Patent Literatures 2 to 4, since the resin still does not form a sufficient network, there is a problem in that the bond between the resin and inorganic filler is cleaved at a high temperature. Therefore, the molded body was sometimes melted at a high temperature, for example, an insulating material can be melted, during soldering of an electric wire. Further, there was a problem in that a molded body is sometimes deformed or generates foams at the time of secondary processing. Further, when the molded body was heated for a short period of time at about 200° C., appearance thereof could be significantly deteriorated or the body could be deformed in some cases.

The method described in Patent Literature 5 has a problem in which poor appearance due to appearance roughness or the above-described granule-shaped material (also referred to as an appearance aggregated substance or simply as an aggregated substance) was easily generated at the time of extrusion molding of a silane crosslinkable flame-retardant polyolefin formed of melt-kneading in batch, together with a silanol condensation catalyst.

It has been found that the poor appearance due to generation of aggregated substance is significantly caused when each component is melt-mixed at a higher temperature or when time is needed from melt-kneading of each component to molding of the resultant blend.

The present invention aims to solve the problem of the conventional silane crosslinking method, and to provide a method of producing a heat-resistant silane crosslinked resin molded body that is excellent in appearance even when the body is produced under conditions in which the aggregated substance is easily generated, and further preferably also has excellent mechanical characteristics and flame retardancy, and a heat-resistant silane crosslinked resin molded body that has excellent appearance, and further preferably has excellent mechanical characteristics and flame retardancy.

In addition, the present invention aims to provide a silane master batch and a heat-resistant silane crosslinkable resin composition, capable of being formed into the heat-resistant silane crosslinked resin molded body, and a method of producing the resin composition.

Furthermore, the present invention aims to provide a heat-resistant product using a heat-resistant silane crosslinked resin molded body obtained by a method of producing a heat-resistant silane crosslinked resin molded body.

Solution to Problem

The above-described problems of the present invention can be solved by the following means.

<1> A method of producing a heat-resistant silane crosslinked resin molded body, comprising:
(a) a step of obtaining a mixture by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from 1 to 15.0 parts by mass, and a silanol condensation catalyst,
(b) a step of obtaining a molded body by molding the mixture, and
(c) a step of obtaining a heat-resistant silane crosslinked resin molded body by contacting the molded body with water,
wherein the step (a) has a step (1) and a step (3) below, and when part of the base resin ($R_B$) is melt-mixed in the step (1), the step (a) has the step (1), a step (2), and the step (3) below:
Step (1): a step of melt-mixing all or part of the base resin ($R_B$), the organic peroxide, the inorganic filler, and the silane coupling agent, at a temperature equal to or higher than the decomposition temperature of the organic peroxide, to prepare a silane master batch,
Step (2): a step of melt-mixing a remainder of the base resin ($R_B$) and the silanol condensation catalyst, to prepare a catalyst master batch, and
Step (3): a step of mixing the silane master batch and either the silanol condensation catalyst or the catalyst master batch.
<2> The method of producing a heat-resistant silane crosslinked resin molded body described in the above item <1>, wherein the base resin ($R_B$) contains 5 to 40 mass % of a styrene-based elastomer, and a mass ratio of the content of the non-aromatic organic oil to the content of the styrene-based elastomer is from 1:5 to 2:1.
<3> The method of producing a heat-resistant silane crosslinked resin molded body described in the above item <1> or <2>, wherein the base resin ($R_B$) contains 5 to 40 mass % of an ethylene rubber, and a mass ratio of the content of the non-aromatic organic oil to the content of the ethylene rubber is from 1:5 to 1:1.

<4> The method of producing a heat-resistant silane crosslinked resin molded body described in any one of the above items <1> to <3>, wherein the base resin ($R_B$) contains 30 to 95 mass % of a linear polyethylene having a density in 0.92 g/cm$^3$ or less or an ethylene-α-olefin copolymer.
<5> The method of producing a heat-resistant silane crosslinked resin molded body described in any one of the above items <1> to <4>, wherein the mixing amount of the silane coupling agent is more than 4 parts by mass and 15 parts by mass or less, with respect to 100 parts by mass of the base resin ($R_B$).
<6> The method of producing a heat-resistant silane crosslinked resin molded body described in any one of the above items <1> to <5>, wherein the mixing amount of the silane coupling agent is 6 to 15.0 parts by mass, with respect to 100 parts by mass of the base resin ($R_B$).
<7> The method of producing a heat-resistant silane crosslinked resin molded body described in any one of the above items <1> to <6>, wherein substantially no silanol condensation catalyst is mixed in the step (1).
<8> The method of producing a heat-resistant silane crosslinked resin molded body described in any one of the above items <1> to <7>, wherein the amount of the silanol condensation catalyst is from 0.05 to 0.5 parts by mass, with respect to 100 parts by mass of the base resin ($R_B$).
<9> A method of producing a heat-resistant silane crosslinkable resin composition, comprising:
    (a) a step of obtaining a mixture by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from 1 to 15.0 parts by mass, and a silanol condensation catalyst,
    wherein the step (a) has a step (1) and a step (3) below, and when part of the base resin ($R_B$) is melt-mixed in the step (1), the step (a) has the step (1), a step (2), and the step (3) below:
    Step (1): a step of melt-mixing all or part of the base resin ($R_B$), the organic peroxide, the inorganic filler, and the silane coupling agent, at a temperature equal to or higher than the decomposition temperature of the organic peroxide, to prepare a silane master batch,
    Step (2); a step of melt-mixing a remainder of the base resin ($R_B$) and the silanol condensation catalyst, to prepare a catalyst master batch, and
    Step (3): a step of mixing the silane master batch and either the silanol condensation catalyst or the catalyst master batch.
<10> The method of producing a heat-resistant silane crosslinkable resin composition as described in the above item <9>, wherein the amount of the silanol condensation catalyst is from 0.05 to 0.5 parts by mass, with respect to 100 parts by mass of the base resin ($R_B$).
<11> A heat-resistant silane crosslinkable resin composition produced by the method described in the above item <9> or <10>.
<12> A heat-resistant silane crosslinked resin molded body produced by the method described in any one of the above items <1> to <8>.
<13> A heat-resistant product having the heat-resistant silane crosslinked resin molded body described in the above item <12>.
<14> The heat-resistant product described in the above item <13>, wherein the heat-resistant silane crosslinked resin molded body is provided as a coating for an electric wire or an optical fiber cable.
<15> A silane master batch, for use in a production of a heat-resistant silane crosslinkable resin composition formed by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from 1 to 15.0 parts by mass, and a silanol condensation catalyst,
    wherein all or part of the base resin ($R_B$), the organic peroxide, the inorganic filler, and the silane coupling agent are melt-mixed, at a temperature equal to or higher than the decomposition temperature of the organic peroxide.

In the present invention, "base resin ($R_B$)" means a resin for forming the heat-resistant silane crosslinked resin molded body or the heat-resistant silane crosslinkable resin composition.

In the present invention, "part of the base resin ($R_B$)" means a resin to be used in the step (1) in the base resin ($R_B$), and part of the base resin ($R_B$) itself (i.e. it has a composition same as the base resin ($R_B$)), part of resin components that constitute the base resin ($R_B$), and a resin component that constitutes the base resin ($R_B$) (for example, a total amount of a specific resin component among a plurality of the resin components).

In addition, "remainder of the base resin ($R_B$)" means a remaining base resin excluding the part to be used in the step (1) in the base resin ($R_B$), and specifically, a remainder of the base resin ($R_B$) itself (i.e. it has a composition same as the base resin ($R_B$)), a remainder of the resin components that constitute the base resin ($R_B$), and a remaining resin component that constitutes the base resin ($R_B$).

Note that, in this patent specification, numerical expressions in a style of " . . . to . . . " will be used to indicate a range including the lower and upper limits represented by the numerals given before and after "to", respectively.

Advantageous Effects of Invention

According to the present invention, a non-aromatic organic oil is mixed with a base resin. According to a production method of the present invention, local heat generation, particularly during melt-blending in a step (a) can be suppressed, to reduce generation of an aggregated substance. In addition, a hydrolysis reaction of a silane coupling agent before molding can be suppressed by preventing moisture from being mixed or also incorporated from outside during melt-kneading (during compounding) and during storage of a melt-kneaded product (compound). Further, the non-aromatic organic oil functions as an appearance improver during molding, and appearance of a molded body can be improved. A heat-resistant silane crosslinked resin molded body that also has excellent mechanical characteristics and flame retardancy can be further preferably produced.

In addition, according to the present invention, an inorganic filler and a silane coupling agent are mixed before and/or during kneading with the base resin ($R_B$). Thus, volatilization of the silane coupling agent during kneading can be suppressed, and the heat-resistant silane crosslinked resin molded body can be efficiently produced. Further, a high heat-resistant silane crosslinked resin molded body to which the inorganic filler is added in a large amount can be produced, without using a special machine such as an electron beam crosslinking machine.

Therefore, according to the present invention, the problems of a conventional silane crosslinking method can be solved, and generation of the aggregated substance is suppressed even when the body is produced under conditions in which the aggregated substance is easily generated, and a heat-resistant silane crosslinked resin molded body that is excellent in appearance, and preferably also has excellent mechanical characteristics and flame retardancy can be produced.

According to the present invention, a silane master batch and a heat-resistant silane crosslinkable resin composition, capable of being formed into the heat-resistant silane crosslinked resin molded body having excellent appearance and flame retardancy can be provided.

In addition, according to the present invention, a heat-resistant product using a heat-resistant silane crosslinked resin molded body can be provided.

Other and further features and advantages of the invention will appear more fully from the following description.

MODE FOR CARRYING OUT THE INVENTION

The preferable embodiment of the present invention is described in detail below.

In both of the "method of producing a heat-resistant silane crosslinked resin molded body" of the present invention and the "method of producing a heat-resistant silane crosslinkable resin composition" of the present invention, the below shown step (a), which at least includes the following step (1) and (3), is carried out.

Accordingly, the "method of producing a heat-resistant silane crosslinked resin molded body" of the present invention and the "method of producing a heat-resistant silane crosslinkable resin composition" of the present invention (in the description of parts common to both, the methods may be collectively referred to as a production method of the present invention in some cases) are collectively described below.

Step (a): Step of obtaining a mixture by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from 1 to 15.0 parts by mass, and a silanol condensation catalyst.

Step (b): Step of obtaining a molded body by molding the mixture.

Step (c): Step of obtaining a heat-resistant silane crosslinked resin molded body by contacting the molded body with water.

Then, this step (a) has at least step (1) and step (3) below when all of the base resin ($R_B$) is melt-mixed in step (1) below, and when part of the base resin ($R_B$) is melt-mixed in step (1) below, step (a) has at least step (1), step (2), and step (3) below.

Step (1): Step of melt-mixing all or part of the base resin ($R_B$), the organic peroxide, the inorganic filler, and the silane coupling agent, at a temperature equal to or higher than the decomposition temperature of the organic peroxide, to prepare a silane master batch, Step (2): Step of melt-mixing a remainder of the base resin ($R_B$) and the silanol condensation catalyst, to prepare a catalyst master batch, and Step (3): Step of mixing the silane master batch and either the silanol condensation catalyst or the catalyst master batch.

Here, "mixing" means an operation for obtaining a uniform mixture.

First, the components used in the present invention will be described.

<Base Resin ($R_B$)>

The base resin ($R_B$) to be used in the present invention at least contains a non-aromatic organic oil used as an oil component, and a resin component.

In this base resin ($R_B$), the content of each component is selected from the following ranges, so that the total amount of components would be 100 mass %.

(Non-Aromatic Organic Oil)

An organic oil is a mixed oil containing three oils: an oil composed of hydrocarbon having an aromatic ring, an oil composed of hydrocarbon having a naphthene ring, and an oil composed of hydrocarbon having a paraffin chain. An aromatic organic oil means one in which the number of carbon atoms that constitute the aromatic ring is 30% or more based on the total number of carbon atoms that constitute the aromatic ring, the naphthene ring and the paraffin chain. The non-aromatic organic oil to be used in the present invention means one in which the number of carbon atoms that constitute the aromatic ring is less than 30% based on the above-described total number of carbon atoms.

Specific examples of such a non-aromatic organic oil include a naphthene oil in which the number of carbon atoms that constitute a naphthene ring is from 30 to 40% based on the above-described total number of carbon atoms, and the number of carbon atoms that constitute a paraffin chain is less than 50% based on the above-described total number of carbon atoms, and a paraffin oil in which the number of carbon atoms that constitute a paraffin chain is 50% or more based on the above-described total number of carbon atoms. As the non-aromatic organic oil, a paraffin oil is preferable.

From a viewpoint of prevention of swelling under a high temperature, the non-aromatic organic oil has an aniline point of preferably 80° C. or higher, and further preferably 100° C. or higher. If the aniline point is 80° C. or higher, it is possible to suppress swelling of the heat-resistant silane crosslinked resin molded body due to impregnation of oil in a high temperature oil. The aniline point can be measured in accordance with the test tube method specified in JIS K 2256: 1996.

In addition, an average molecular weight of the non-aromatic organic oil is preferably from 200 to 2,000, and further preferably from 250 to 1,000. When the average molecular weight is within the above-described range, volatilization of the non-aromatic organic oil during kneading or the like can be prevented, and an effect of preventing moisture from being mixed can also be improved.

The average molecular weight is expressed in terms of a value determined by a vapor pressure equilibrium method by using a preliminarily prepared calibration curve.

Examples of the non-aromatic organic oil that can be used in the present invention include DIANA PROCESS OIL PW90, PW380 (trade names, manufactured by Idemitsu Kosan Co., Ltd.), COSMO NEUTRAL 500 (trade name, manufactured by COSMO OIL Co., Ltd.) and the like.

The content of the non-aromatic organic oil in the base resin ($R_B$) is from 5 to 40 mass %, preferably from 5 to 35 parts by mass, and further preferably from 7 to 33 parts by mass. When the content of the non-aromatic organic oil is too low, an effect of the non-aromatic organic oil is not thoroughly exhibited in some cases. On the other hand, when the content is too high, shear heat is not appreciably generated upon gelating during melt-kneading, and a temperature of the melt-kneaded product does not thoroughly rise, and therefore a silane grafting reaction does not progress in some cases. With regard to the content of the non-aromatic organic oil, within the above-mentioned ranges, a content ratio relative to an ethylene rubber or a styrene-based elastomer further preferably satisfies any of the ranges mentioned later.

(Resin Component)

The resin component to be used in the present invention is not particularly limited, as long as the resin component is a component having a crosslinking site that can react with a crosslinking group of a hydrolyzable silane coupling agent in the presence of the organic peroxide, for example, an unsaturated bonding site in a carbon chain, or a carbon atom having a hydrogen atom in a main chain or at an end. Example of such a resin component include a polyolefin resin (PO), a polyester resin (PE), a polyamide resin (PA), a polystyrene resin (PS), a polyol resin, or the like.

The resin component to be used in the present invention also contains, in addition to the above-described each resin component, various rubber and elastomers formed of a polymer or copolymer having the above-described crosslinking site, for example, ethylene rubber and the styrene-based elastomer.

The resin component to be used in the present invention is preferably a polyolefin resin, ethylene rubber and a styrene-based elastomer.

The resin component may be used singly alone, or be used by combining two or more kinds thereof. When two or more kinds of the resin components are used in combination, it is preferable to use the polyolefin resin in combination with any one or both of the ethylene rubber and the styrene-based elastomer.

The polyolefin resin as the resin component is not particularly limited, as long as the polyolefin resin is a resin composed of a polymer obtained by polymerizing or copolymerizing a compound having an ethylenically unsaturated bond, and the polyolefin resins that are conventionally known and used for heat-resistant resin compositions can be used.

Examples thereof include resins of a polyethylene, a polypropylene, an ethylene-α-olefin copolymer, a block copolymer of polypropylene with ethylene-α-olefin resin, and a polyolefin copolymer having an acid copolymerization component or an acid ester copolymerization component.

Among them, in view of grafting efficiency, insulation resistance, high accepting properties to various inorganic fillers including metal hydrate, and capability of maintaining mechanical strength even when the inorganic fillers are incorporated thereinto in a large amount, a resin of a polyethylene, of an ethylene-α-olefin copolymer, or of a polyolefin copolymer having an acid copolymerization component or an acid ester copolymerization component is preferable, and a resin of a linear polyethylene having a density of 0.92 $g/cm^3$ or less or of an ethylene-α-olefin copolymer is further preferable.

The polyolefin resin may be used singly alone, or be used by combining two or more kinds thereof.

Polyethylene is not particularly limited, as long as the polyethylene is a polymer containing an ethylene component as a constituent. The polyethylene includes a homopolymer consisting of ethylene, a copolymer of ethylene and 5 mol % or less of α-olefin (excluding propylene), and a copolymer of ethylene and 1 mol % or less of non-olefin having carbon, oxygen, and hydrogen atoms only in a functional group (for example, JIS K 6748). As the above-mentioned α-olefin and non-olefin, conventionally known ones that have been used so far as copolymerization components for polyethylene can be used without any particular restriction.

In the present invention, the density of the polyethylene is not particularly limited, but is preferably 0.92 $g/cm^3$ or less, and further preferably from 0.87 to 0.91 $g/cm^3$. The density of the polyethylene can be measured based on JIS K 7112.

Examples of the polyethylene that can be used in the present invention include high-density polyethylene (HDPE), low-density polyethylene (LDPE), ultra high molecular weight polyethylene (UHMW-PE), linear low-density polyethylene (LLDPE), and very-low-density polyethylene (VLDPE). Among them, linear low-density polyethylene or low-density polyethylene is preferable.

The polyethylene may be used singly alone or be used by combining two or more kinds thereof.

Specific examples of the ethylene-α-olefin copolymer preferably include a copolymer of ethylene and an α-olefin having 3 to 12 carbon atoms (excluding one included in the above-mentioned polyethylene), and the density thereof is not particularly limited.

Examples of the α-olefin component of the ethylene-α-olefin copolymer include components such as propylene, 1-butene, 1-hexene, 4-methyl-1-pentene, 1-octene, 1-decene, 1-dodecene, and the like. The ethylene-α-olefin copolymer is preferably a copolymer of ethylene with α-olefin component having 3 to 12 carbon atoms (excluding one included in the polyethylene). Specific examples thereof include an ethylene-propylene copolymer, an ethylene-butylene copolymer, and an ethylene-α-olefin copolymer that is synthesized in the presence of a single-site catalyst. The ethylene-α-olefin copolymer may be used singly alone or be used by combining two or more kinds thereof.

Specific examples of the acid copolymerization component and the acid ester copolymerization component in the polyolefin copolymer having the acid copolymerization component or the acid ester copolymerization component include a carboxylic acid compound such as (meth)acrylic acid and an acid ester compound such as vinyl acetate and alkyl (meth)acrylate. Herein, the alkyl group of the alkyl (meth)acrylate is preferably those having 1 to 12 carbon atoms, and example of those may include methyl group, ethyl group, propyl group, butyl group, or hexyl group. Example of the polyolefin copolymer having an acid copolymerization component or an acid ester copolymerization component (excluding one included in the polyethylene) include ethylene-vinyl acetate copolymer, ethylene-(meth)acrylic acid copolymers, ethylene-alkyl (meth)acrylate copolymers or the like. Among them, ethylene-vinyl acetate copolymers, ethylene-methyl acrylate copolymers, ethylene-ethyl acrylate copolymers, and ethylene-butyl acrylate copolymers are preferable; and ethylene-vinyl acetate copolymers and ethylene-ethyl acrylate copolymers are particularly preferable from the standpoint of the acceptability to the inorganic filler and heat resistance. The density of the polyolefin copolymer having an acid copolymerization component or an acid ester copolymerization component is not particularly limited. The polyolefin copolymer having an acid copolymerization component or an acid ester copolymerization component may be used singly alone or be used by combining two or more kinds thereof.

When the base resin ($R_B$) contains the polyolefin resin, the content of the polyolefin resin in the base resin ($R_B$) is not particularly limited, but is preferably from 20 to 95 mass %, and further preferably from 25 to 85 mass %. When the polyolefin resin is contained at this content, a consolidated network can be formed, and high heat resistance can be obtained.

When the polyolefin resin is one of the resin composed of the linear polyethylene having the density of 0.92 $g/cm^3$ or less and the resin composed of the ethylene-α-olefin copolymer, the content thereof in the base resin ($R_B$) is not particularly limited, but is preferably from 30 to 95 mass %, and further preferably from 32 to 85 mass %.

The ethylene rubber is not particularly limited, as long as the ethylene rubber is rubber composed of the copolymer obtained by copolymerizing a compound having an ethylenically unsaturated bond, and a conventionally known one can be used. Specific examples of the ethylene rubber preferably include a rubber composed of a copolymer of ethylene and α-olefin, and a rubber composed of a terpolymer of ethylene, α-olefin and diene. The diene constituent of the terpolymer may be a conjugated diene constituent or a non-conjugated diene constituent, and a non-conjugated diene constituent is preferable. In other words, specific examples of the terpolymer include a terpolymer of ethylene, α-olefin, and conjugated diene, and a terpolymer of ethylene, α-olefin, and non-conjugated diene; and a copolymer of ethylene and α-olefin, and a terpolymer of ethylene, α-olefin, and non-conjugated diene are preferable.

As a specific example of the α-olefin constituent, each α-olefin constituent having 3 to 12 carbon atoms is preferable, and specific examples include those exemplified in ethylene-α-olefin copolymer. Specific examples of the conjugated diene constituent include those exemplified in styrene-based elastomer as described later, and butadiene or the like is preferable. Specific examples of the non-conjugated diene constituent include dicyclopentadiene (DCPD), ethylidene norbornene (ENB), 1,4-hexadiene, and the like, and ethylidene norbornene is preferable.

Specific examples of the rubber composed of the copolymer of ethylene and α-olefin include ethylene-propylene rubber, ethylene-butene rubber, and ethylene-octene rubber. Specific examples of the rubber composed of the terpolymer of ethylene, α-olefin, and diene include ethylene-propylene-diene rubber and ethylene-butene-diene rubber.

Among them, ethylene-propylene rubber, ethylene-butene rubber, ethylene-propylene-diene rubber, and ethylene-butene-diene rubber are preferable, and ethylene-propylene rubber and ethylene-propylene-diene rubber are further preferable.

In the ethylene rubber, an amount of the ethylene constituent (referred to as an ethylene amount) in the copolymer is preferably from 45 to 70 mass %, and further preferably from 50 to 68 mass %. As a method of measuring the ethylene amount, a value measured in accordance with the method described in ASTM D3900 is adopted.

The content of the ethylene rubber in the base resin ($R_B$) is not particularly limited, but is preferably from 0 to 40 mass %, further preferably from 5 to 40 mass %, and still further preferably from 10 to 38 mass %. When the ethylene rubber is contained at the above-mentioned content, generation of the aggregated substances due to a crosslinking reaction between the resin components and a condensation reaction between the silane coupling agents during melt-blending can be suppressed, and appearance of the molded body is excellent.

The ethylene rubber only needs to satisfy the above-mentioned content, and a ratio of the content of the non-aromatic organic oil to the content of the ethylene rubber (non-aromatic organic oil:ethylene rubber) is preferably from 1:5 to 1:1, further preferably from 1:4 to 3:4, and still further preferably from 3:10 to 2:1. When this ratio is less than 1:5, a state is formed in which the non-aromatic organic oil is substantially oil-added to the ethylene rubber, and force of preventing moisture from being mixed becomes somewhat weak in some cases. On the other hand, when this ratio exceeds 1:1, the molded body has a possibility of causing bleed of the aromatic organic oil in long-term storage after molding.

The styrene-based elastomer means one composed of a polymer containing, as a constituent, an aromatic vinyl compound in its molecule. Accordingly, in the present invention, even if a polymer contains an ethylene constituent in the molecule, if the polymer contains an aromatic vinyl compound constituent, such a polymer is classified into the styrene-based elastomer.

Examples of the styrene-based elastomer may include a block copolymer of and a random copolymer of a conjugated diene compound with an aromatic vinyl compound, and a hydrogenated derivative thereof. Examples of the constituent of the aromatic vinyl compound may include styrene, p-(tert-butyl)styrene, α-methylstyrene, p-methylstyrene, divinylbenzene, 1,1-diphenylstyrene, N,N-diethyl-p-aminoethylstyrene, vinyltoluene, and the like. Among them, a styrene constituent is preferable. The constituent of the aromatic vinyl compound is used one kind alone, or is used by combining two or more kinds thereof. Examples of the constituent of the conjugated diene compound include butadiene, isoprene, 1,3-pentadiene, and 2,3-dimethyl-1,3-butadiene. Among them, butadiene constituent is preferable as the conjugated diene compound. The constituent of the conjugated diene compound may be used singly alone, or be used by combining two or more kinds thereof. Furthermore, as the styrene-based elastomer, an elastomer obtained in the same manner and does not contain a styrene component but contains an aromatic vinyl compound other than styrene may be used.

The styrene-based elastomer preferably has a content of the styrene constituent of 30% or more. When the styrene content is too low, oil resistance is reduced, or abrasion resistance is reduced, in some cases.

Specific examples of the styrene-based elastomers include a styrene-ethylene-butylene-styrene block copolymer (SEBS), a styrene-isoprene-styrene block copolymer (SIS), a hydrogenated SBS, a styrene-ethylene-ethylene-propylene-styrene block copolymer (SEEPS), a styrene-ethylene-propylene-styrene block copolymer (SEPS), a hydrogenated SIS, a hydrogenated styrene-butadiene rubber (HSBR), and a hydrogenated acrylonitrile-butadiene rubber (HNBR).

As the styrene-based elastomer, commercially available products can be used. For example, use can be made of Septon 4077, Septon 4055, Septon 8105 (trade names, manufactured by Kuraray Co., Ltd.), Dynaron 1320P, Dynaron 4600P, 6200P, 8601P, and 9901P (trade names, manufactured by JSR Corporation.), and the like.

The content of the styrene-based elastomer in the base resin ($R_B$) is not particularly limited, but is preferably from 0 to 45 mass %, and further preferably from 5 to 40 mass %. When the content of the styrene-based elastomer is too high, the heat resistance or long-term heat resistance is adversely affected in some cases.

The content of the styrene-based elastomer only needs to satisfy the above-mentioned content, and a ratio of the content of the non-aromatic organic oil to the content of the styrene-based elastomer (non-aromatic organic oil:styrene-based elastomer) is preferably from 1:5 to 2:1, further preferably from 1:4 to 2:3, and still further preferably from 3:10 to 5:6. When this ratio is less than 1:5, a state is formed in which the non-aromatic organic oil is substantially oil-added to the styrene-based elastomer, and force of preventing moisture from being mixed becomes somewhat weak in some cases. On the other hand, when this ratio exceeds 2:1, the molded body has a possibility of causing bleed of the aromatic organic oil in long-term storage after molding.

The resin may contain, in addition to the above-mentioned components, an additive as mentioned later or a resin component other than the above-described resin component.

<Organic Peroxide>

The organic peroxide plays a role of generating a radical at least by thermal decomposition, to cause a grafting reaction of the silane coupling agent onto the resin component, as a catalyst. In particular, when the silane coupling agent contains an ethylenically unsaturated group, the organic peroxide play a role of causing the grafting reaction due to a radical reaction (including an abstraction reaction of a hydrogen radical from the resin component) between the ethylenically unsaturated group and the resin component.

The organic peroxide to be used in the present invention is not particularly limited, as long as the organic peroxide is one that generates a radical. For example, as the organic peroxide, the compound represented by the formula $R^1$—OO—$R^2$, $R^1$—OO—C(=O)$R^3$, or $R^4$C(=O)—OO (C=O)$R^5$ is preferable. Herein, $R^1$, $R^2$, $R^3$, $R^4$, and $R^5$ each independently represent an alkyl group, an aryl group, or an acyl group. Among them, in the present invention, it is preferable that all of $R^1$, $R^2$, $R^3$, $R^4$, and $R^5$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexine-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butyl-cumyl peroxide and the like. Among them, dicumyl peroxide (DCP), 2,5-dimethyl-2,5-di-(tert-butyl peroxy)hexane, or 2,5-dimethyl-2,5-di-(tert-butyl peroxy)hexine-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or exothermic reaction starts, when the organic peroxide is heated at room temperature in a heating rate of 5° C./min under a nitrogen gas atmosphere, by a thermal analysis such as a DSC method.

<Inorganic Filler>

In the present invention, the inorganic filler is not particularly limited as long as it has, on its surface, a site that can form a hydrogen bond or the like or a site that can be chemically linked by a covalent bond, with a reaction site such as a silanol group of a silane coupling agent. For the inorganic filler, examples of the site that can be chemically linked to the reaction site of the silane coupling agent may include an OH group (OH group of hydroxy group, of water molecule in hydrous substance or crystallized water, or of carboxyl group), amino group, a SH group, and the like.

As such an inorganic filler, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, and hydrotalcite; boron nitride, silica (crystalline silica, amorphous silica, and the like), carbon, clay, zinc oxide, tin oxide, titanium oxide, molybdenum oxide, antimony trioxide, a silicone compound, quartz, talc, zinc borate, white carbon, zinc borate, zinc hydroxystannate, or zinc stannate.

Among them, as the inorganic filler, at least one kind of silica, aluminum hydroxide, magnesium hydroxide, calcium carbonate, magnesium carbonate, zinc borate, and zinc hydroxystannate is preferable, and at least one kind selected from the group consisting of silica, aluminum hydroxide, magnesium hydroxide, calcium carbonate and antimony trioxide is further preferable.

The inorganic filler may be used singly alone, or in combination of two or more kinds thereof.

The inorganic filler has an average particle diameter of preferably 0.2 to 10 μm, more preferably 0.3 to 8 μm, further preferably 0.4 to 5 μm, and particularly preferably 0.4 to 3 μm. When the average particle diameter of the inorganic filler is too small, the inorganic fillers can cause secondary aggregation at the time of mixing with a silane coupling agent, and thus the appearance of a molded articles can be deteriorated or the aggregated substances can be generated. On the other hand, when the average particle diameter is too large, the appearance can be deteriorated, or the effect on maintaining the silane coupling agent can be reduced, thereby generating a problem in crosslinking. The average particle diameter is obtained by dispersing the inorganic filler in alcohol or water, and then measuring using an optical particle diameter measuring device such as a laser diffraction/scattering particle diameter distribution measuring device.

As the inorganic filler, a surface-treated inorganic filler, surface-treated with a silane coupling agent can be used. Specific examples of silane-coupling-agent-surface-treated metal hydrate include KISUMA 5L, KISUMA 5P (both trade names, magnesium hydroxide, manufactured by Kyowa Chemical Industry Co., Ltd. or the like) and aluminum hydroxide. The amount of surface treatment of the inorganic filler with a silane coupling agent is not particularly limited, but is 2 mass % or less, for example.

<Silane Coupling Agent>

The silane coupling agent to be used in the present invention only needs to have a group that can perform a grafting reaction onto a resin component in the presence of a radical, and a group that can be chemically bonded with inorganic filler, and preferably is a hydrolyzable silane coupling agent having a hydrolyzable group at an end. The silane coupling agent is further preferably one having, at an end, a group containing an amino group, a glycidyl group, or an ethylenically unsaturated group, and a group containing a hydrolyzable group; and still further preferably a silane coupling agent having a group containing an ethylenically unsaturated group, and a group containing a hydrolyzable group, at an end. The group containing an ethylenically unsaturated group is not particularly limited, and specific examples thereof include a vinyl group, an allyl group, a (meth)acryloyloxy group, a (meth)acryloyloxyalkylene group, and a p-styryl group. In addition, these silane coupling agents and a silane coupling agent having any other end group may be simultaneously used.

As such a silane coupling agent, for example, a compound represented by the following Formula (1) can be used.

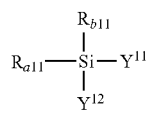

Formula (1)

In Formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

$R_{a11}$ of the silane coupling agent represented by Formula (1) is preferably a group having an ethylenically unsaturated group. The group having an ethylenically unsaturated group is as explained above, and is preferably a vinyl group.

$R_{b11}$ represents an aliphatic hydrocarbon group, a hydrogen atom, or $Y^{13}$ to be described below. Example of the aliphatic hydrocarbon group may include a monovalent aliphatic hydrocarbon group having 1 to 8 carbon atoms other than an aliphatic unsaturated hydrocarbon. $R_{b11}$ is preferably $Y^{13}$ to be described below.

$Y^{11}$, $Y^{12}$, and $Y^{13}$ each independently represent a hydrolyzable organic group, and examples thereof may include an alkoxy group having 1 to 6 carbon atoms, an aryloxy group having 6 to 10 carbon atoms, and an acyloxy group having 1 to 4 carbon atoms. Among them, an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is more preferable, and methoxy is particularly preferable.

As the silane coupling agent, a silane coupling agent that has high hydrolysis rate is preferable, and a silane coupling agent, in which $R_{b11}$ is $Y^{13}$ and also $Y^{11}$, $Y^{12}$, and $Y^{13}$ are the same each other, is more preferable. A hydrolyzable silane coupling agent in which at least one of $Y^{11}$, $Y^{12}$, and $Y^{13}$ is a methoxy group is further preferable, and a hydrolyzable silane coupling agent in which all of $Y^{11}$, $Y^{12}$, and $Y^{13}$ are methoxy groups is particularly preferable.

Specific examples of the silane coupling agent having a vinyl group, a (meth)acryloyloxy group or a (meth)acryloyloxyalkylene group at an end include organosilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, vinyltriacetoxysilane; methacryloxypropyltrimethoxysilane, methacryloxypropyltriethoxysilane, and methacryloxypropylmethyldimethoxysilane. The silane coupling agent may be used singly alone, or two or more kinds thereof. Among these crosslinking silane coupling agents, a silane coupling agent having a vinyl group and an alkoxy group on an end thereof is more preferable, and vinyltrimethoxysilane and vinyltriethoxysilane are still more preferable.

Specific examples of one having a glycidyl group at an end include 3-glycidoxypropyltriethoxysilane, 3-glycidoxypropylmethyldiethoxysilane, 3-glycidoxypropyltrimethoxysilane, 3-glycidoxypropylmethyldimethoxysilane, and 2-(3,4-epoxycyclohexyl)ethyltrimethoxysilane.

The silane coupling agent may be used as it is, or may be diluted with a solvent and used.

<Silanol Condensation Catalyst>

The silanol condensation catalyst has an action of binding the silane coupling agents which have been grafted onto the resin component to each other, by a condensation reaction in the presence of water. Based on the action of the silanol condensation catalyst, the resin components are crosslinked between themselves through silane coupling agent. As a result, the heat-resistant silane crosslinked resin molded body having excellent heat resistance can be obtained.

As the silanol condensation catalyst to be used in the present invention, an organic tin compound, a metal soap, a platinum compound, and the like can be mentioned. General examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among them, the organic tin compounds such as dibutyltin dilaurate, dioctyltin dilaurate, dibutyltin dioctylate, and dibutyltin diacetate are particularly preferable.

<Carrier Resin>

The silanol condensation catalyst to be used in the present invention is mixed with a resin, if desired. Such a resin (also referred to as a carrier resin) is not particularly limited, but a part of the base resin ($R_B$) can be used. The part of the base resin ($R_B$) may be one or more component of the resin components that constitute the base resin ($R_B$), or a part of the whole resin components that constitute the base resin ($R_B$), but one or more component of the resin components that constitute the base resin ($R_B$) is preferable. As the resin component in this case, the polyolefin resin is preferable, and in view of good affinity with the silanol condensation catalyst and also of excellent heat resistance, a resin containing ethylene as a constituent is further preferable among the polyolefin, and polyethylene is particularly preferable.

<Additive>

To the heat-resistant silane crosslinked resin molded body and the heat-resistant silane crosslinkable resin composition, various additives which are generally used for electric wires, electric cables, electric cords, sheets, foams, tubes, and pipes, may be properly used in the range that does not adversely affect the purpose of the present invention. Examples of these additives include a crosslinking assistant, an antioxidant, a lubricant, a metal inactivator, a filler, and other resins.

These additives, particularly the antioxidant and the metal inactivator may be mixed with any of the components, but may preferably be mixed with the carrier resin. It is preferable that the crosslinking assistant is not substantially contained. Especially, it is preferable that the crosslinking assistant be not substantially mixed in the step (a) of producing the silane master batch. If the crosslinking assistant is not substantially mixed, crosslinking of the resin components with each other during kneading hardly occurs, and the appearance and the heat resistance of the heat-resistant silane crosslinked resin molded body are excellent. Here, the term "is not substantially contained or is not substantially mixed" means that the crosslinking assistant is not actively added or mixed and it is not intended to exclude the crosslinking assistant which is inevitably contained or mixed.

The crosslinking assistant refers to one that forms a partial crosslinking structure with the resin component, in the presence of the organic peroxide. Examples thereof may include polyfunctional compounds, for example, a methacrylate compound such as polypropyleneglycol diacrylate and trimethylolpropane triacrylate, an allyl compound such as triallyl cyanurate, a maleimide compound, or a divinyl compound.

Examples of the antioxidant may include an amine-based antioxidant such as 4,4'-dioctyl-diphenylamine, N,N'-diphenyl-p-phenylenediamine, 2,2,4-trimethyl-1,2-dihydroquinoline polymer; a phenol-based antioxidant such as pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and a sulfur-based antioxidant such as bis(2-methyl-4-(3-n-alkylthiopropionyloxy)-5-tert-butylphenyl)sulfide, 2-mercaptobenzimidazole and zinc salts thereof, and pentaerythritol-tetrakis(3-laurylthiopropionate). An antioxidant is preferably included in a content of 0.1 to 15.0 parts by mass, and more preferably included in a content of 0.1 to 10 parts by mass, with respect to 100 parts by mass of the resin.

Examples of the lubricant may include hydrocarbon-based, siloxane-based, fatty-acid-based, fatty-acid-amide-based, ester-based, alcohol-based, or metal-soap-based lubricants. These lubricants are preferably added to the carrier resin.

Examples of the metal inactivator may include N,N'-bis (3-(3,5-di-tert-butyl-4-hydroxyphenyl)propionyl)hydrazine, 3-(N-salicyloyl)amino-1,2,4-triazole, and 2,2'-oxamidebis (ethyl-3-(3,5-di-tert-butyl-4-hydroxyphenyl)propionate).

As the filler (including a flame-retardant agent (assistant)), a filler other than the above-mentioned various fillers can be mentioned.

Next, the production method of the present invention is specifically described.

In the production method of the present invention, in the step (a), the organic peroxide of from 0.01 to 0.6 parts by mass, the inorganic filler of from 10 to 400 parts by mass, the silane coupling agent of from 1 to 15.0 parts by mass and the silanol condensation catalyst, with respect to 100 parts by mass of the base resin ($R_B$) containing the non-aromatic organic oil at least from 5 to 40 mass %, are melt-mixed to prepare a mixture. In this manner, the silane master batch is prepared.

The mixing amount of the organic peroxide is within the range of 0.01 to 0.6 parts by mass, and preferably 0.1 to 0.5 parts by mass, with respect to 100 parts by mass of the base resin ($R_B$). When the mixing amount of the organic peroxide is too low, the crosslinking reaction cannot progress during crosslinking and the silane coupling agents can be condensed with each other, and heat resistance, mechanical strength, and reinforcement performance cannot be sufficiently obtained in some cases. On the other hand, when the mixing amount of the organic peroxide is too high, too many of the resin components can be directly crosslinked with each other by a side reaction, and thus aggregated substances can be generated. In other words, polymerization can be performed in a suitable range by adjusting the mixing amount of the organic peroxide within this range, and the composition that is excellent in extrusion performance can be obtained without generating a gel-like aggregated substance.

The mixing amount of the inorganic filler is from 10 to 400 parts by mass, preferably from 30 to 280 parts by mass, with respect to 100 parts by mass of the base resin ($R_B$). In the case where the mixing amount of the inorganic filler is too small, the grafting reaction of the silane coupling agent can be non-uniformly made, and thus the desired heat resistance cannot be obtained, or the appearance can be deteriorated due to the non-uniform reaction. On the other hand, in the case where the mixing amount is too large, since the load at the time of molding or kneading can become very high, a secondary molding can be difficult.

The mixing amount of the silane coupling agent is from 1 to 15.0 parts by mass, preferably more than 4 parts by mass and 15.0 parts by mass or less, and more preferably from 6 to 15.0 parts by mass, with respect to 100 parts by mass of the base resin ($R_B$).

When the mixing amount of the silane coupling agent is too low, the crosslinking reaction does not sufficiently progress, and excellent flame resistance cannot be developed in some cases. On the other hand, when the mixing amount is too high, the silane coupling agent cannot be wholly adsorbed on the surface of the inorganic filler, and the silane coupling agent can be volatilized during kneading, which is not economical. In addition, the silane coupling agent that is not adsorbed thereon can be condensed, and the aggregated substance or burning/scorch can be caused on the molded body, and the appearance can be deteriorated.

When the mixing amount of the silane coupling agent is more than 4.0 parts by mass and 15.0 parts by mass or less, the appearance is excellent. Details of a mechanism thereof are unknown yet, but are presumed as described below. Specifically, in the step (a), with regard to the reactions caused by organic peroxide decomposition at the time of silane grafting of the silane coupling agent onto the resin component, the grafting reaction having a high reaction rate among the grafting reactions between the silane coupling agents and the resin components, and the condensation reaction between the silane coupling agents become dominant. Accordingly, the crosslinking reaction between the resin components, particularly between the polyolefin resins, which causes appearance roughness or appearance aggregated substance, are not likely to occur. Thus, the crosslinking reaction between the resin components can be effectively suppressed depending on the mixing amount of the silane coupling agent. Thus, the appearance during molding is improved. In addition, the above-described defect caused by the crosslinking reaction between the resin components is minimized, and therefore it becomes difficult to cause poor appearance even if the extruder is stopped and then the operation is resumed. Thus, the silane crosslinked resin molded body having favorable appearance can be produced with suppressing the crosslinking reaction between the resin components.

Meanwhile, in the step (a), a large amount of the silane coupling agent is bonded or adsorbed on the inorganic filler and immobilized thereon. Accordingly, the condensation reaction between the silane coupling agents that are bonded or adsorbed on the inorganic filler is difficult to occur. In addition, the condensation reaction between free silane coupling agents that are not bonded or adsorbed on the inorganic filler is rarely caused either, and generation of the gel-like aggregated substance caused by the condensation reaction between the free silane coupling agents can be suppressed.

Thus, it is considered that both of the crosslinking reaction between the resin components and the condensation reaction between the silane coupling agents can be suppressed by using a specific amount of the silane coupling agent, and the silane crosslinked resin molded body having clean appearance can be produced.

In the production method of the present invention, the step (a) includes "aspect in which the total amount of the base resin ($R_B$), namely 100 parts by mass, is incorporated" and "aspect in which part of the base resin ($R_B$) is incorporated" for the base resin ($R_B$). Accordingly, in the production method of the present invention, 100 parts by mass of the base resin ($R_B$) only need to be contained in the mixture to be obtained in the step (a), and the total amount of the base resin ($R_B$) may be mixed in the step (1) as mentioned later, or the part thereof is mixed in the step (1) and a remainder may be mixed as the carrier resin in step (2) as mentioned later, that is, the base resin ($R_B$) may be mixed in both steps, the step (1) and the step (2).

In the case where part of the base resin ($R_B$) is incorporated in the step (2), the mixing amount of 100 parts by mass of the base resin ($R_B$) in the step (a) is the total amount of the base resin ($R_B$) to be mixed in the step (1) and the step (2).

Here, in the case where the remainder of the base resin ($R_B$) is incorporated in the step (2), the base resin ($R_B$) is incorporated in the step (1), preferably from 80 to 99 parts by mass, and further preferably from 94 to 98 parts by mass, and in the step (2), preferably from 1 to 20 parts by mass, and further preferably from 2 to 6 parts by mass.

This step (a) includes at least the step (1) and the step (3), and in a specific case, has at least the step (1) to the step (3). When the step (a) has at least these steps, the components can be uniformly melt-mixed, and an expected effect can be obtained.

Step (1): Step of melt-mixing all or part of the base resin ($R_B$), the organic peroxide, the inorganic filler, and the silane coupling agent, at a temperature equal to or higher than the decomposition temperature of the organic peroxide, to prepare a silane master batch, Step (2): Step of melt-mixing a remainder of the base resin ($R_B$) and the silanol condensation catalyst, to prepare a catalyst master batch, and Step (3): Step of mixing the silane master batch and either the silanol condensation catalyst or the catalyst master batch.

In the step (1), the base resin ($R_B$), the organic peroxide, the inorganic filler, and the silane coupling agent are placed in a mixer, and the resultant mixture is melt-kneaded while heated to the temperature equal to or higher than the decomposition temperature of the organic peroxide, to prepare the silane master batch.

In the step (1), the kneading temperature at which the above-mentioned components are melt-blended is a temperature equal to or higher than the decomposition temperature of the organic peroxide, and preferably a temperature of the decomposition temperature of the organic peroxide+25° C. to 110° C. The decomposition temperature is preferably set after melting the resin component. In addition, the kneading conditions, such as a kneading time may be appropriately determined. If the kneading is performed at a temperature lower than the decomposition temperature of the organic peroxide, the grafting reaction of the silane coupling agent and the like reaction do not occur, and thus, a desired heat resistance cannot be obtained, and also the organic peroxide can react during the extrusion, and thus, molding into a desired shape cannot be conducted.

As a kneading method, a method that is generally used with rubber and plastic can be satisfactorily used, and a kneading device may be appropriately selected depending on the mixing amount of the inorganic filler. As a kneading device, a single-screw extruder, a twin-screw extruder, a roll, a Banbury mixer, or various kneaders may be used, and an enclosed mixer such as Banbury mixer or various kneaders is preferable from the standpoint of the dispersibility of the resin component and the stability of the crosslinking reaction.

In addition, when the inorganic filler is blended exceeding 100 parts by mass with respect to 100 parts by mass of the resin, the kneading is generally performed with a continuous kneader, a pressured kneader, or a Banbury mixer.

In the present invention, the phrase "all or part of the base resin ($R_B$), the organic peroxide, the inorganic filler, and the silane coupling agent are melt-mixed" does not specify the mixing order at the time of melt-mixing, and means that mixing may be made in any order. In other words, the mixing order in the step (1) is not particularly limited.

In addition, a method of mixing the base resin ($R_B$) is not particularly limited, either. For example, a base resin ($R_B$) that is premixed and prepared may be used, or each component, for example, the resin component and the oil component may be separately used, respectively.

In the step (1), for example, the base resin ($R_B$), the organic peroxide, the inorganic filler, and the silane coupling agent can be melt-mixed at one time.

It is preferable that the silane coupling agent be not introduced alone into the silane master batch, but be premixed with the inorganic filler, or the like, and then introduced therein. In this manner, it makes it difficult for the silane coupling agent to volatilize during kneading, and it is possible to prevent the condensation among that the silane coupling agents that are not adsorbed on the inorganic fillers, which makes melt-blending difficult. In addition, a desired shape can be obtained upon extrusion molding.

As such a mixing method, preferred is a method of mixing or dispersing an organic peroxide, an inorganic filler, and a silane coupling agent, at a temperature less than the decomposition temperature of the organic peroxide by using a mixer-type kneader such as a Banbury mixer and a kneader, and then melt-mixing the resultant mixture with the base resin ($R_B$). In this manner, an excessive crosslinking reaction between the resin components can be prevented, and excellent appearance can be obtained.

The inorganic filler, the silane coupling agent, and the organic peroxide are mixed at a temperature less than the decomposition temperature of the organic peroxide, and preferably at room temperature (25° C.). A method of mixing the inorganic filler, the silane coupling agent, and the organic peroxide is not particularly limited, and the organic peroxide may be simultaneously mixed with the inorganic filler or the like, or may also be mixed in any of stages of mixing the silane coupling agent with the inorganic filler. Specific examples of the method of mixing the inorganic filler, the silane coupling agent, and the organic peroxide include mixing methods such as wet treatment and dry treatment.

Specific examples of the method of mixing the silane coupling agent with the inorganic filler include a wet treatment in which the silane coupling agent is added to the inorganic filler being in a state dispersed in a solvent such as alcohol and water; a dry treatment in which both are added and mixed under heating or non-heating; and both of these methods. In the present invention, a dry treatment is preferable in which the silane coupling agent is added to the inorganic filler, preferably a dried inorganic filler, and mixed under heating or non-heating.

In the above-mentioned wet mixing, it becomes easy for the silane coupling agent to form a strong chemical bond with the inorganic filler, and therefore a subsequent silanol condensation reaction is less likely to proceed sometimes. On the other hand, in the dry mixing, bonding of the silane coupling agent and the inorganic filler is comparatively weak, and therefore it becomes easy for the silanol condensation reaction to progress effectively.

The silane coupling agent, added to the inorganic filler, is present surrounding the surface of the inorganic filler; and a part or whole thereof may be absorbed onto the inorganic filler or may be chemically bonded to the surface of the inorganic filler. In this state, it makes it possible to significantly suppress the volatilization of the silane coupling agent during kneading with a kneader or a Banbury mixer. In addition, it is considered that the unsaturated group of the silane coupling agent is reacted with the resin component by the added organic peroxide. Further, it is considered that during molding, the silane coupling agents are condensed by the silanol condensation catalyst. The mechanism of this reaction is unknown, but it is considered that, at the time of the condensation reaction, when bonding of the silane coupling agent with the inorganic filler is too strong, the silane coupling agent bonded with the inorganic filler is not freed therefrom even if the silanol condensation catalyst is added thereto, and it becomes difficult for the silanol condensation reaction (crosslinking reaction) to progress.

In the step (1), the organic peroxide may be dispersed into the inorganic filler after being mixed with the silane coupling agent, or may be separately dispersed into the inorganic filler separated from the silane coupling agent. In the present invention, it is preferable that the organic peroxide and the silane coupling agent be substantially simultaneously mixed.

In the present invention, only the silane coupling agent may be mixed with the inorganic filler, and subsequently the organic peroxide may be added thereto, depending on production conditions. In other words, in the step (1), inorganic filler preliminarily mixed with the silane coupling agent can be used. As a method of adding the organic peroxide thereto, one in which the peroxide is dispersed into other components, or the peroxide alone may be added thereto.

In a preferable mixing method, subsequently, the mixture of the inorganic filler, the silane coupling agent, and the organic peroxide is melt-kneaded with the base resin ($R_B$), while performing heating at a temperature equal to or higher than the decomposition temperature of the organic peroxide, to prepare a silane master batch.

In the step (1), no silanol condensation catalyst is used. In other words, in the step (1), the above-mentioned each component is kneaded without substantially mixing the silanol condensation catalyst. Thus, melt-mixing is easily conducted without causing condensation of the silane coupling agents, and a desired shape can be obtained at the time of extrusion molding. Here, the term "without substantially mixing" means that the silanol condensation catalyst unavoidably existing therein is not excluded, and may exist at a degree at which the above-mentioned problem due to silanol condensation of the silane coupling agent is not caused. For example, in the step (1), the silanol condensation catalyst may exist when the content is 0.01 parts by mass or less, with respect to 100 parts by mass of the base resin ($R_B$).

As described above, the step (1) is carried out, and the silane master batch is prepared.

The silane master batch (also referred to as a silane MB) to be prepared in the step (1) is used for producing a mixture (heat-resistant silane crosslinkable resin composition) to be prepared in the step (a), as mentioned later, preferably with the silanol condensation catalyst or a catalyst master batch as mentioned later. This silane MB is a mixture to be prepared by melt-mixing the above-described components according to the step (1).

The silane master batch prepared in the step (1) contains a decomposed product of the organic peroxide, a reaction mixture of the resin component, the inorganic filler and the silane coupling agent, and the non-aromatic organic oil, and contains two kinds of the silane crosslinkable resins (silane grafted polymers) in which the silane coupling agents are grafted onto the resin components at a degree at which molding can be made in the step (b) mentioned later.

In the production method of the present invention, subsequently, when the part of the base resin ($R_B$) is melt-mixed in the step (1), the step (2) is carried out in which the remainder of the base resin ($R_B$) and the silanol condensation catalyst are melt-mixed, to prepare a catalyst master batch. Accordingly, in the case where all of the base resin ($R_B$) is melt-mixed in the step (1), the step (2) may not be carried out, or other resins as mentioned later may be used.

A mixing ratio of the base resin ($R_B$) and the silanol condensation catalyst in the step (2) is set so as to satisfy a mixing ratio of the base resin ($R_B$) in the silane master batch in the step (3) as mentioned later. The base resin ($R_B$) may be mixed, as the carrier resin, with the silanol condensation catalyst, and the remainder of the base resin ($R_B$) mixed in the step (1) may be used.

Mixing of the silanol condensation catalyst with the base resin ($R_B$) is appropriately determined according to a melting temperature of the base resin ($R_B$). For example, the kneading temperature is preferably applied from 80 to 250° C., and further preferably from 100 to 240° C. Kneading conditions such as a kneading time can be appropriately set. A kneading method can be carried out in a manner similar to the above-described kneading method.

With the silanol condensation catalyst, any other carrier resin may be mixed in addition to or in place of the remainder of the base resin ($R_B$). In other words, the catalyst master batch may be prepared in the step (2) by melt-mixing the silanol condensation catalyst with the remainder of the base resin ($R_B$) in the case of melt-mixing of the part of the base resin ($R_B$) in the step (1) or with a resin other than the resin component used in the step (1). Other carrier resins are not particularly limited, and various resins can be used.

When the carrier resin is any other resin, in view of capability of rapidly promoting silane crosslinking and difficulty in generating the aggregated substance during molding in the step (b), an amount of incorporating any other resin thereinto is preferably from 1 to 60 parts by mass, further preferably from 2 to 50 parts by mass, and still further preferably from 2 to 40 parts by mass, with respect to 100 parts by mass of the base resin ($R_B$).

In addition, a filler may be added or may not to be added to this carrier resin. A filler amount on the above occasion is not particularly limited, but is preferably 350 parts by mass or less with respect to 100 parts by mass of the carrier resin. The reason is that, when the filler amount is too large, it is difficult for the silanol condensation catalyst to disperse, and thereby rendering progress of crosslinking difficult. On the other hand, when the amount of the carrier resin is too large, a degree of crosslinking in the molded body is reduced, and it is possible that proper heat resistance cannot be obtained.

The thus prepared catalyst master batch is a mixture of the silanol condensation catalyst and the carrier resin, and the filler to be added if desired.

The thus catalyst master batch (also referred to as a catalyst MB) is used, together with the silane MB, for production of the heat-resistant silane crosslinkable resin composition to be prepared in the step (a).

In the production method of the present invention, subsequently, the step (3) of obtaining a mixture by mixing the silane master batch and either the silanol condensation catalyst or the catalyst master batch prepared in the step (2), is carried out.

As the mixing method, any mixing method may be applied, as long as a uniform mixture can be obtained as mentioned above. For example, pellets may be blended with each other at ordinary temperature or a high temperature, such as dry blend, and then placed in a molding machine, or the pellets may be blended, and then melt-mixed, re-pelletized, and then placed in a molding machine.

In any mode of mixing, in order to avoid the silanol condensation reaction, it is preferable that the silane master batch and the silanol condensation catalyst are not kept in a high temperature state for a long period of time in the state of being mixed. The mixture to be obtained is taken as a mixture in which at least moldability in molding in the step (b) is kept.

The amount of incorporating the silanol condensation catalyst is preferably from 0.0001 to 0.7 parts by mass, and further preferably from 0.001 to 0.5 parts by mass, with respect to 100 parts by mass of the base resin ($R_B$). When the mixing amount of the silanol condensation catalyst is within the above-mentioned range, the crosslinking reaction by the condensation reaction of the silane coupling agent easily progresses substantially uniformly, and heat resistance, appearance, and physical properties of the heat-resistant silane crosslinked resin molded body are excellent, and productivity is also improved.

When crosslinking treatment is conducted without employing warm water treatment or the like in the step (c) as mentioned later, the amount of incorporation is preferably from 0.05 to 0.5 parts by mass, and further preferably 0.1 parts by mass or more in order to develop excellent heat resistance immediately after extrusion. When 0.1 parts by mass or more of the silanol condensation catalyst is added thereto, it may cause a reaction in the molding machine and the appearance can be deteriorated in some cases. However, according to an effect of appearance improvement by addition of the non-aromatic organic oil thereto, a problem of deterioration of appearance does not occur even upon adding 0.1 parts by mass or more of the catalyst thereto, and excellent heat resistance can be obtained immediately after extrusion.

In the step (b), mixing conditions of the silane master batch with the silanol condensation catalyst or the catalyst master batch are appropriately selected. In other words, when the silanol condensation catalyst alone is mixed with the silane master batch, the mixing conditions are set to appropriate melt-mixing conditions according to the resin component.

On the other hand, when the catalyst master batch containing the silanol condensation catalyst is mixed with the silane master batch, melt-mixing is preferable in view of dispersion of the silanol condensation catalyst, and is basically similar to the melt-mixing in the step (1). There are resin components whose melting points cannot be measured by DSC or the like, elastomers for example, but kneading is performed at a temperature at which at least any of the resin component and the organic peroxide melts. The melting temperature is appropriately selected according to the melting temperature of the carrier resin, and it is preferably from 80 to 250° C., and more preferably from 100 to 240° C. In addition, the kneading conditions such as a kneading time may be appropriately set.

This step (3) only needs to be a step in which the silane master batch and the silanol condensation catalyst (C) are mixed, to obtain a mixture, and is preferably a step in which the catalyst master batch containing the silanol condensation catalyst (C) and the carrier resin is melt-mixed with the silane master batch.

As described above, the step (a), in other words, the method of producing a heat-resistant silane crosslinkable resin composition of the present invention, is carried out, and as mentioned later, a heat-resistant silane crosslinkable resin composition containing at least two kinds of silane crosslinkable resins in which the crosslinking methods are different, is produced. Accordingly, the heat-resistant silane crosslinkable resin composition of the present invention is a composition obtained by carrying out the step (a), and is considered as an admixture of the silane master batch and either the silanol condensation catalyst or the catalyst master batch. The components are basically the same with the silane master batch and the silanol condensation catalyst or the catalyst master batch.

As described above, the silane MB, and the silanol condensation catalyst or the catalyst master batch can be used as a batch set for producing a heat-resistant silane crosslinkable resin composition.

In the method of producing a heat-resistant silane crosslinked resin molded body of the present invention, subsequently, the step (b) and (c) are carried out. In other words, in the method of producing a heat-resistant silane crosslinked resin molded body of the present invention, the step (b) of obtaining a molded body by molding the mixture thus obtained, namely, the heat-resistant silane crosslinkable resin composition of the present invention, is performed. The step (b) only has to mold the mixture, and the molding method and molding conditions can be appropriately selected depending on the form of the heat-resistant product of the present invention. For example, extrusion molding or the like is selected in a case where the heat-resistant product of the present invention is an electric wire or an optical fiber cable.

In the step (b), when the mixing amount of the silane coupling agent exceeds 4 parts by mass, the operation of the extruder can also be resumed without reducing excellent appearance of the molded body after the extruder is once stopped due to an event such as cleaning of the extruder, changing of set-ups, adjusting of decentering or suspension of production.

In addition, the step (b) can be carried out simultaneously or continuously with the step (3) in the step (a). For example, a series of steps can be employed in which the silane master batch and either the silanol condensation catalyst or the catalyst master batch are melt-kneaded in a coating device, and subsequently, for example, extruded and coated on an electric wire or fiber, and molded into a desired shape.

As described above, the heat-resistant silane crosslinkable resin composition of the present invention is molded, but the molded body of the heat-resistant silane crosslinkable resin composition to be obtained in the step (a) and the step (b) is a non-crosslinked body. Accordingly, a heat-resistant silane crosslinked resin molded body of the present invention is a crosslinked or finally crosslinked molded body formed by carrying out the following step (c) after the step (a) and the step (b).

In the method of producing the heat-resistant silane crosslinked resin molded body of the present invention, a step is carried out in which the molded body (non-crosslinked body) obtained in the step (b) is contacted with water. Thus, the hydrolyzable group of the silane coupling agent is hydrolyzed into silanol, hydroxyl groups in the silanol are condensed with each other by the silanol condensation catalyst existing in the resin, and the crosslinking reaction occurs, and the heat-resistant silane crosslinked resin molded body in which the molded body is crosslinked can be obtained. The treatment itself in this step (c) can be carried out according to an ordinary method. The hydrolyzable groups in the silane coupling agent are hydrolyzed by contacting moisture with the molded body, and the silane coupling agents are condensed with each other to form a crosslinked structure.

The condensation reaction between the silane coupling agents progresses just in storage at ordinary temperature. Accordingly, in the step (c), it is unnecessary to positively bring the molded body (non-crosslinked body) with water. In order to further accelerate crosslinking, the molded body can also be contacted with moisture. For example, the method of positively contacting the molded body with water can be employed, such as immersion into warm water, placement in a wet heat bath, and exposure to high temperature water vapor. In addition, pressure may be applied in order to penetrate moisture thereinto on the above occasion.

As described above, the method of producing the heat-resistant silane crosslinked resin molded body of the present invention is carried out, and the heat-resistant silane crosslinked resin molded body is produced from the heat-resistant silane crosslinkable resin composition of the present invention. Accordingly, the heat-resistant silane crosslinked resin molded body of the present invention is a molded body obtained by carrying out the step (a) to the step (c).

Details of a reaction mechanism in the production method of the present invention are unknown yet, but it is considered as described below. Specifically, when the resin component is heat-kneaded with the inorganic filler and the silane coupling agent, in the presence of the organic peroxide, at a temperature equal to or higher than the decomposition temperature of the organic peroxide, the organic peroxide is decomposed to generate radical, and grafting onto the resin component is caused by the silane coupling agent. In addition, a reaction of forming a chemical bond due to covalent bonding of the silane coupling agent with the group such as the hydroxyl group on the surface of the inorganic filler also partially occurs by heating on the above occasion.

In the present invention, the final crosslinking reaction is performed in the step (c), and owing thereto, when the silane coupling agent is incorporated into the resin in a specific amount as mentioned above, the inorganic filer can be incorporated thereinto in a large amount without adversely affecting extrusion processability during molding, and the molded body can simultaneously have the heat resistance, the mechanical characteristics and the like while ensuring the excellent flame retardancy.

In addition, a mechanism of operation in the above-described process of the present invention is unknown yet, but it is assumed as described below. Specifically, by using the inorganic filler and the silane coupling agent before kneading and/or during kneading with the base resin ($R_B$), the silane coupling agent is bonded with the inorganic filler by means of the alkoxy group and is bonded with a non-crosslinked part in the resin component by means of the ethylenically unsaturated group, such as vinyl group, existing at another end, or is physically and chemically adsorbed onto pores or the surface of the inorganic filler, and kept thereon, without being bonded with the inorganic filler. Thus, the present invention can form a silane coupling agent bonded with the inorganic filler by strong bonding (as the reason therefor, for example, formation of chemical bond with hydroxyl group or the like on the surface of the inorganic filler is considered), and a silane coupling agent bonded therewith by weak bonding (as the reason therefor, for example, interaction due to hydrogen bond, interaction between ions, partial electric charges, or dipoles, action due to adsorption, or the like is considered). In this state, if the organic peroxide is added thereto and kneading is performed, at least two kinds of silane crosslinkable resins are formed in which the silane coupling agents having different bondings with the inorganic filler are graft reacted onto the resin component, without hardly causing volatilization of the silane coupling agent, as mentioned later.

By the above kneading, among the silane coupling agents, the silane coupling agent having strong bonding with the inorganic filler keeps the bonding with the inorganic filler, and the crosslinkable group such as ethylenically unsaturated group is subjected to the grafting reaction onto a crosslinkable site in the resin component. In particular, when a plurality of the silane coupling agents are bonded on the surface of one inorganic filler particle through strong bonding, a plurality of the resin components are bonded through the inorganic filler particle. By these reactions or bondings, a crosslinked network through the inorganic filler spreads. In other words, a silane crosslinkable resin is formed in which the silane coupling agents bonded with the inorganic filler is graft reacted onto the resin component.

In the case of the silane coupling agent having strong bonding with the inorganic filler, the condensation reaction due to silanol condensation catalyst in the presence of water hardly occurs, and bonding with the inorganic filler is kept. Thus, the bonding of the inorganic filler with the resin component is formed, and crosslinking of the resin components through the silane coupling agent is caused. By this, adhesion between the resin component and the inorganic filler is consolidated, and the molded body that is excellent in mechanical strength and abrasion resistance and hard to be scratched is obtained.

On the other hand, among the silane coupling agents, the silane coupling agent having weak bonding with the inorganic filler is released from the surface of the inorganic filler, and the crosslinkable group of the silane coupling agent, such as the ethylenically unsaturated group or the like, reacts with the radical of the resin component as generated by hydrogen radical abstraction caused by the radical generated by decomposition of the organic peroxide, and the grafting reaction occurs. In other words, the silane crosslinkable resin is formed in which the silane coupling agent released from the inorganic filler is graft reacted onto the resin component. The silane coupling agent in the thus-formed grafted part is mixed with the silanol condensation catalyst afterward, and contacted with moisture to cause the crosslinking reaction by the condensation reaction.

In particular, in the present invention, the crosslinking reaction due to the condensation reaction using the silanol condensation catalyst in the presence of water in the step (c) is performed after the molded body is formed. Thus, workability in the steps up to forming the molded body is superb, and higher heat resistance than ever before can be obtained, in comparison with a conventional method that forms a molded body after the final crosslinking reaction. In addition, a plurality of the silane coupling agents can be bonded on the surface of one inorganic filler particle, and high mechanical strength can be obtained.

As described above, it is considered that the silane coupling agent bonded with the inorganic filler by strong bonding contributes to high mechanical characteristics, and depending on circumstances, to abrasion resistance, scratch resistance or the like. Further, it is considered that the silane coupling agent bonded with the inorganic filler by weak bonding contributes to improvement of a degree of crosslinking, in other words, improvement of the heat resistance.

In the present invention, in particular, generation of the aggregated substance is significantly suppressed even when the molded body is produced under conditions in which the aggregated substance is easily generated, and the silane crosslinked resin molded body having excellent appearance can be produced. In other words, when the step (a) at least having the above-described steps (1) and (3) is carried out by using the base resin ($R_B$) containing the non-aromatic organic oil of from 5 to 40 parts by mass, local heat generation during melt-kneading in the step (a), particularly in the step (1), is suppressed, and generation of the aggregated substance can be significantly reduced. Further, when the step (a) is carried out with using the base resin ($R_B$) containing the non-aromatic organic oil, a hydrolysis reaction of the silane coupling agent before molding can be suppressed by preventing moisture from being mixed or also incorporated thereinto from outside during melt-kneading and during storage of a melt-blended product, and the non-aromatic organic oil functions as an appearance improver during molding, and the appearance of the molded body can be significantly improved.

A mechanism for this point is unknown yet, but it is assumed as described below.

Specifically, causes of deteriorated appearance of the heat-resistant silane crosslinked resin molded body are considered to be a silane crosslinked aggregated substance due to local silane crosslinking and poor flowability due to crosslinking of the resin components with each other.

It is considered that the silane crosslinked aggregated substance is generated as described below. Specifically, not only the silane grafting reaction, but also a polymerization reaction between the resin components, the condensation reaction between the silane coupling agents, and the like occur for reasons such as locally increased heating temperature of the melt-kneaded product and a localized crosslinking agent (silane coupling agent) during the silane grafting reaction. A substance having a larger molecular weight in comparison with others is locally produced by these reactions. This substance having the larger molecular weight is more significantly produced as the melt-kneading temperature increases, and furthermore is not melted even during molding, and formed into the gel-like aggregated substance. This substance causes poor appearance.

However, in the present invention, it is considered that generation of the above-described event (the polymerization reaction, the condensation reaction and the like) that may occur during melt-kneading can be suppressed and generation of the silane crosslinked aggregated substance is significantly reduced by performing specific melt-kneading by using the base resin ($R_B$) containing a specific amount of the non-aromatic organic oil.

In addition, it is considered that the poor flowability due to crosslinking of the resin components with each other is caused by occurrence of the condensation reaction of the silane coupling agent in an earlier stage. This event may be caused by occurrence of the hydrolysis reaction of the silanol group when moisture is mixed for any reason after the silane grafting reaction. Even when the silanol group is hydrolyzed, no condensation reaction occurs under ordinal temperature, and therefore there exists no problem. However, when kneading and molding are performed together with the silanol condensation catalyst at a high temperature at the time of molding, the silanol condensation reaction occurs, and the silane coupling agents are crosslinked by the condensation reaction during molding in some cases. Mixing of moisture may be ordinarily caused not in a special condition, for example, under a high temperature and high humidity. "Crosslinking" means a pseudo-state in which the molecular weight is infinitely large, but in the above-described crosslinking, the molecular weight becomes large, although the molecular weight is not infinitely large. When the molecular weight becomes large, flowability is generally deteriorated, and moldability, particularly high-speed moldability is deteriorated.

However, in the present invention, by performing specific melt-kneading with using the base resin ($R_B$) containing the specific amount of the non-aromatic organic oil, mixing of excessive moisture from outside can be blocked to prevent the hydrolysis reaction of the silanol group before molding. In addition, the flowability can be improved by minimizing the molecular weight of the crosslinked product by the above-described silanol condensation reaction.

Thus, it is considered that the appearance of the molded body can be improved.

Furthermore, in the present invention, when more than 4.0 parts by mass and 15.0 parts by mass or less of the silane coupling agent are mixed with the inorganic filler, as mentioned above, the crosslinking reaction between the resin components during melt-kneading in the step (a), especially in the step (1), can be effectively suppressed. In addition, the silane coupling agent is bonded with the inorganic filler, and is hard to volatilize even during melt-kneading in the step (a), especially in the step (1), and the reaction between the free silane coupling agents can also be effectively suppressed. Accordingly, it is considered that, even if the extruder is stopped and then the operation is resumed, it is hard to cause poor appearance, and a silane crosslinked resin molded body having a favorable appearance can be produced.

Here, the term "once stopped and then the operation is resumed" means, although conditions are influenced by the composition of the base resin ($R_B$), processing conditions or the like, and cannot be unequivocally mentioned, for example, the extruder can be stopped for up to 5 minutes, preferably up to 10 minutes, and further preferably up to 15 minutes in terms of an interval. Temperature at this time is not particularly limited, as long as it is a temperature at which the resin component is softened or melted, and is 200° C., for example.

The production method of the present invention is applicable to a production of a component part of or a member of a product (including a semi-finished product, a part and a member), such as a product requiring heat resistance or flame retardancy, a product requiring strength, and a product using a rubber material. Specific examples of such a heat-resistant product or a flame-retardant product include an electric wire such as a heat-resistant flame-retardant insulated wire, a heat-resistant flame-retardant cable coating material, a rubber substitute wire and cable material, other heat-resistant flame-retardant wire parts, a flame-retardant heat-resistant sheet, and a flame-retardant heat-resistant film. In addition, the production method is applicable to production of a power supply plug, a connector, a sleeve, a box, a tape base material, a tube, a sheet, a packing, a cushion material, a seismic isolating material, a wiring material used in internal and external wiring for electric and electronic instruments, and particularly an electric wire or an optical fiber cable. Among the above described component or the like of product, the production method of the present invention is particularly preferably applied to production of an insulator, a sheath, or the like of electric wire and optical cable, and it can be formed as a coating thereof.

The insulator, the sheath or the like can be molded into a shape thereof by, for example, coating while melt-kneading is performed in an extrusion coating device. These molded articles such as insulators or sheaths may be produced by extrusion-coating the high heat-resistant crosslinking composition that does not melt at a high temperature and is added with the inorganic fillers in a large amount, around a conductor or around a conductor that is prepared by attaching tensile strength fiber in a length or entwisting, using an extrusion coating device that is widely used, without using a specific instrument such as an electron beam crosslinking instrument. For example, as a conductor, any one such as single-conductor or twisted-conductor of a soft copper may be used. In addition, as a conductor, in addition to a naked conductor, a tin-coated conductor or a conductor having an enamel-coated insulating layer may be used. The thickness of the insulating layer formed around the conductor (a coating layer formed of the heat-resistant resin composition of the present invention) is not particularly limited, and generally about 0.15 to 5 mm.

EXAMPLES

The present invention is described in more detail based on examples given below, but the present invention is not limited by the following examples. In addition, in Table 1 to Table 4, the numerical values for incorporated amounts of the respective Examples and Comparative Examples are in terms of part by mass.

Examples 1 to 43 and Comparative Examples 1 to 8 were carried out by using the components shown in Table 1 to Table 4, and changing specifications or manufacturing conditions or the like, respectively, and the results of evaluation as mentioned later were collectively shown.

The compound described below was used as each component shown in Tables 1 to 4.

<Base resin ($R_B$)>
(1) Resin Component
As the polyolefin resin,
Resin A: "UE320" (manufactured by Japan Polyethylene Corporation, NOVATEC PE (trade name), linear low-density polyethylene (LLDPE), density: 0.92 g/cm$^3$)
Resin B: "Evolue SP0540" (trade name, manufactured by Prime Polymer Co., Ltd., linear metallocene polyethylene (LLDPE), density: 0.90 g/cm$^3$)
Resin C: "ENGAGE 7256" (trade name, manufactured by Dow Chemical Japan Ltd., linear low-density polyethylene (LLDPE), density: 0.885 g/cm$^3$)
Resin D: "EV170" (trade name, manufactured by Du Pont-Mitsui Chemicals, ethylene-vinyl acetate copolymer resin (EVA), the content of VA: 33 mass %, density: 0.96 g/cm$^3$)
Resin E: "NUC6510" (trade name, manufactured by Nippon Unicar Co. Ltd., ethylene-ethyl acrylate resin, the content of EA: 23 mass %, density: 0.93 g/cm$^3$)
As the styrene-based elastomer,
"SEPTON 4077" (trade name, manufactured by Kuraray Co., Ltd., SEPS, the content of styrene: 30 mass %)
As the ethylene rubber,
Ethylene rubber A: "EPT3045" (trade name, manufactured by Mitsui Chemicals, Inc., ethylene-propylene-diene rubber, the content of diene: 4.7 mass %, the content of ethylene: 56 mass %)
Ethylene rubber B: "EPT0045" (trade name, manufactured by Mitsui Chemicals, Inc., ethylene-propylene rubber, the content of diene: 0 mass %, the content of ethylene: 51 mass %)
(2) Oil Component
As the non-aromatic organic oil,
"COSMO NEUTRAL 500" (trade name, manufactured by COSMO OIL LUBRICANTS CO., LTD., paraffin oil, aniline point: 109.1° C., average molecular weight: 521)

<Inorganic Filler>
Magnesium hydroxide 1: "KISUMA 5" (trade name, manufactured by Kyowa Chemical Industry Co., Ltd., surface-untreated magnesium hydroxide)
Magnesium hydroxide 2: "KISUMA 5L" (trade name, manufactured by Kyowa Chemical Industry Co., Ltd., magnesium hydroxide pretreated with silane coupling agent, treatment amount 1 mass %)
Aluminum hydroxide: "Higilite 42M" (trade name, manufactured by SHOWA DENKO K.K., surface-untreated aluminum hydroxide)
Calcium carbonate: "SOFTON 1200" (trade name, manufactured by SHIRAISHI CALCIUM KAISHA, LTD., surface-untreated calcium carbonate)
<Organic Peroxide>
"Perkadox BC-FF" (trade name, dicumyl peroxide (DCP) by Kayaku Akzo Corporation, decomposition temperature: 149° C.)
<Silane Coupling Agent>
"KBM-1003" (trade name, manufactured by Shin-Etsu Chemical Co., Ltd., vinyltrimethoxysilane)
<Silanol Condensation Catalyst>
"ADKSTAB OT-1" (trade name, manufactured by ADEKA CORPORATION, dioctyltin dilaurate)
<Carrier Resin>
Above-mentioned "UE320" (trade name)

Examples 1 to 40 and Comparative Examples 1 to 8

In Examples and Comparative Examples, part of resin components that compose a base resin ($R_B$) was used as a carrier resin of a catalyst master batch. Specifically, LLDPE (UE320) (5 parts by mass), one of the resin components that compose the base resin ($R_B$), was used.

In the mass ratios shown in Tables 1 to 4, an organic peroxide, an inorganic filler, and a silane coupling agent were placed in a 10 L Henschel mixer manufactured by Toyo Seiki Kogyo Co., Ltd., and then mixed at room temperature (25° C.) for 1 hour in the mixer, to obtain a powder mixture.

Subsequently, in the mass ratios shown in Tables 1 to 4, the powder mixture and resin components and an oil component shown in Tables 1 to 4 were placed in a 2 L Banbury mixer manufactured by Nippon Roll MFG Co., Ltd., and kneaded at a temperature equal to or higher than the decomposition temperature of the organic peroxide, specifically a temperature of 180° C. to 190° C., for about 10 minutes at the revolution number of 35 rpm, and then discharged at a material discharging temperature of 180 to 190° C., to obtain a silane master batch (step (1)). The silane MB obtained contains at least two kinds of silane crosslinkable resins in which silane coupling agents were graft reacted onto the resin components.

On the other hand, in the mass ratios shown in Tables 1 to 4, a carrier resin "UE320" and a silanol condensation catalyst were separately melt-mixed at 180 to 190° C. using a Banbury mixer, and the resultant mixture was discharged at a material discharging temperature of 180 to 190° C., to obtain a catalyst master batch (Step (2)). This catalyst master batch is a mixture of the carrier resin and the silanol condensation catalyst.

Subsequently, in the mass ratios shown in Tables 1 to 4, that is, in the ratios to be 5 parts by mass of the carrier resin in the catalyst MB with respect to 95 parts by mass of the base resin ($R_B$) in the silane MB, the silane MB and the catalyst MB were melt-mixed using a Banbury mixer at 180° C. (step (3)).

The step (a) was conducted in this manner, and the heat-resistant silane crosslinkable resin composition was prepared. This heat-resistant silane crosslinkable resin composition is a mixture of the silane MB and the catalyst MB, and contains at least two kinds of the above-mentioned silane crosslinkable resins.

Subsequently, this heat-resistant silane crosslinkable resin composition was placed in a 40 mm (screw diameter) extruder (compression-zone screw temperature: 190° C., head temperature: 200° C.) with L/D=24 (ratio of screw effective length L to diameter D), and coated on an outside of a 1/0.8 TA conductor at a 1 mm thickness, to obtain an electric wire (non-crosslinked) having an outer diameter of 2.8 mm (step (b)).

The thus-obtained electric wire (non-crosslinked) was allowed to stand for 24 hours under an atmosphere of a temperature of 80° C. and a humidity of 95%, to perform a polycondensation reaction of silanol (step (c)).

In this manner, an electric wire coated with the heat-resistant silane crosslinked resin molded body was manufactured.

This heat-resistant silane crosslinked resin molded body is, as mentioned above, transformed into the above-mentioned silane crosslinked resin in which the silane coupling agent in the silane crosslinkable resin was converted into silanol, and hydroxyl groups in the silanol were crosslinked with each other by the condensation reaction.

Example 41

A silane MB and a catalyst MB were prepared (Step (1) and Step (2)), respectively, in the same manner as the above-described Example 1, except that each component shown in Table 4 was used in the mass ratio (parts by mass) shown in the same Table.

Subsequently, the silane MB and the catalyst MB thus obtained were placed in a closed-type ribbon blender, and dry-blended at room temperature (25° C.) for 5 minutes, to obtain a dry-blended product. On the above occasion, a mixing ratio of the silane MB to the catalyst MB was adjusted to a mass ratio (see Table 4) to be 95 parts by mass of the base resin in the silane MB to 5 parts by mass of the carrier resin in the catalyst MB. Subsequently, this dry-blended product was placed in a 40 mm extruder (compression zone screw temperature: 190° C., head temperature: 200° C.) with L/D=24, and coated on the outside of a 1/0.8 TA conductor at a 1 mm thickness while melt-blending was performed in the extruder screw, to obtain an electric wire (non-crosslinked) having an outer diameter of 2.8 mm (step (3) and step (b)).

The thus-obtained electric wire (non-crosslinked) was allowed to stand for 24 hours under an atmosphere of a temperature of 80° C. and a humidity of 95% (step (c)).

In this manner, an electric wire coated with the heat-resistant silane crosslinked resin molded body was manufactured.

Example 42

An electric wire (outer diameter: 2.8 mm, non-crosslinked) in which a periphery of a conductor was coated with a heat-resistant silane crosslinkable resin composition was obtained (step (a) and step (b)) in the same manner as the above-described Example 1, except that each component shown in Table 4 was used in the mass ratio (parts by mass) shown in the same Table.

The thus-obtained electric wire was allowed to stand for 72 hours under an atmosphere of a temperature of 23° C. and a humidity of 50% (step (c)).

In this manner, an electric wire coated with the heat-resistant silane crosslinked resin molded body was manufactured.

Example 43

A silane MB was prepared (Step (1)) in the same manner as the above-described Example 1, except that each component shown in Table 4 was used in the mass ratio (parts by mass) shown in the same Table.

On the other hand, in the mass ratios shown in Table 4, a carrier resin "UE320" and a silanol condensation catalyst were melt-mixed in a twin-screw extruder, to obtain a catalyst MB (Step (2)). A screw diameter of the twin-screw extruder was 35 mm, and cylinder temperature was set to 180 to 190° C. The catalyst MB obtained is a mixture of the carrier resin and the silanol condensation catalyst.

Subsequently, the silane MB and the catalyst MB obtained were melt-mixed using a Banbury mixer at 180° C. (step (3)). A mixing ratio of the silane MB to the catalyst MB was adjusted to a mass ratio (see Table 4) to be 95 parts by mass of the base resin in the silane MB to 5 parts by mass of the carrier resin in the catalyst MB. In this manner, a heat-resistant silane crosslinkable resin composition was prepared. This heat-resistant silane crosslinkable resin composition is a mixture of the silane MB and the catalyst MB, and contains at least two kinds of the above-mentioned silane crosslinkable resins.

Subsequently, this heat-resistant silane crosslinkable resin composition was placed in a 40 mm extruder (compression zone screw temperature: 190° C., head temperature: 200° C.) with L/D=24, and coated on an outside of 1/0.8 TA conductor at a 1 mm thickness, to obtain an electric wire (non-crosslinked) having an outer diameter of 2.8 mm (step (b)).

The electric wire (non-crosslinked) obtained was allowed to stand in a state in which the wire was immersed into warm water having a temperature of 50° C. for 10 hours (step (c)).

In this manner, an electric wire having a coating formed of the heat-resistant silane crosslinked resin molded body was manufactured.

The electric wires thus manufactured were subjected to the following evaluation, and the results thereof are shown in Tables 1 to 4.

<Mechanical Characteristics>

A tensile test was conducted to evaluate mechanical characteristics of the electric wire.

This tensile test was conducted in accordance with JIS C 3005. The test was conducted at a gauge length of 25 mm and at a tensile speed of 200 mm/min by using a tubular piece of an electric wire prepared by removing a conductor from the electric wire, to measure tensile strength (MPa) and tensile elongation (%).

In an evaluation of the tensile strength, one having a tensile strength of 10 MPa or more is taken as "A", one having a tensile strength of 6.5 MPa or more and less than 10 MPa is taken as "B", one having a tensile strength less than 6.5 MPa is taken as "C", and "A" and "B" are acceptable levels.

In an evaluation of the tensile elongation, one having a tensile elongation of 200% or more is taken as "A", one having a tensile elongation of 125% or more and less than 200% is taken as "B", and one having a tensile elongation less than 125% is taken as "C", and "A" and "B" are acceptable levels.

<Heat Resistance Test 1>

As a heat resistance test 1, a test was conducted in accordance with "heat deformation test" specified in JIS C 3005.

A load was adjusted to 5 N, and heating temperature was adjusted to 160° C.

In an evaluation, one having a deformation ratio of 40% or less is taken as "A" (acceptable level), and one having a deformation ratio of 40% or more is taken as "B".

<Heat Resistance Test 2>

As a heat resistance test 2, a hot set test was conducted. As the hot set test, a tubular piece of an electric wire was prepared, a gauge line of 50 mm in length was added thereto, and then after setting a pendulum of 20 N/cm² to the tubular piece, the tubular piece was left for 15 minutes in a constant temperature chamber of 170° C. Thereafter, the length after being left was measured, to obtain elongation percentage.

In an evaluation, one having an elongation percentage of 50% or less is taken as "A", one having a percentage of more than 50% and 100% or less is taken as "B", and one having a percentage of more than 100% is taken as "C", and "A" and "B" are acceptable levels.

<Bleed Characteristics of Electric Wire>

A bleed test was conducted to evaluate bleed characteristics of the electric wire.

As the bleed test, an electric wire produced was left for one week under an atmosphere of 50° C., and then a bleed state on a surface of the electric wire was visually confirmed.

In an evaluation, one having bleed unconfirmable on the surface of the electric wire is taken as "A", one having bleed confirmable thereon but having no problem as a product is taken as "B", and one having bleed clearly confirmable is taken as "C", and "A" and "B" are a desirable level as products.

This bleed test is a reference test, and is not always required to reach the desirable level.

<Extrusion Appearance Characteristics 1 of Electric Wire>

Extrusion appearance test 1 was performed to evaluate extrusion appearance characteristics of electric wires.

In the extrusion appearance test 1, evaluation was made by observing extrusion appearance at the time of manufacturing electric wires. Specifically, when extrusion was conducted using an extruder having a screw diameter of 25 mm at a linear velocity of 10 m/min, an electric wire having favorable appearance is taken as "A", one having slightly poor appearance is taken as "B", and one having significantly poor appearance is taken as "C", and "A" and "B" are acceptable levels as products.

<Extrusion Appearance Characteristics 2 of Electric Wire>

Extrusion appearance test 2 was conducted, to evaluate extrusion appearance characteristics of electric wires produced under conditions in which the aggregated substance was easily generated (in the case of melt-blending components at a higher temperature).

In the extrusion appearance test 2, an evaluation was made by observing appearance after performing extrusion under conditions same with the extrusion appearance test 1 by using an electric wire produced in a manner similar to each Example and Comparative Example, except that melt-kneading and material discharge in the above-mentioned step (1) were performed at 180 to 210° C. for 7 minutes at the revolution number of 60 rpm, and a step (3) and a step (b) subsequent thereto were rapidly carried out.

In the evaluation, one having favorable appearance of the electric wire is taken as "A", one having somewhat poor appearance is taken as "B", and one having significantly poor appearance is taken as "C", and "A" and "B" are acceptable levels.

<Extrusion Appearance Characteristics 3 of Electric Wire>

Extrusion appearance test 3 was conducted, to evaluate extrusion appearance characteristics of an electric wire produced under conditions in which the aggregated substance was easily generated (in the case of needing time from melt-blending of components to molding).

In the extrusion appearance test 3, an evaluation was made by observing appearance after performing extrusion under conditions same with the extrusion appearance test 1 by using an electric wire produced in a manner similar to each Example and Comparative Example, except that a heat-resistant silane crosslinkable resin composition which was obtained by performing melt-kneading and material discharge in the above-mentioned step (1) at 180 to 210° C. for 7 minutes at the revolution number of 60 rpm and carrying out a step (3) subsequent thereto, was left for 24 hours under an atmosphere of 30° C. and a humidity of 95%, and then a step (b) and a step (c) were carried out.

In the evaluation, one having favorable appearance of the electric wire is taken as "A", one having somewhat poor appearance is taken as "B", and one having significantly poor appearance is taken as "C", and "A" and "B" are acceptable levels.

<Heat Resistance Test 3>

With regard to Examples 38 to 40, a heat resistance test 3 was conducted in accordance with "heat deformation test" specified in JIS C 3005. A load was adjusted to 5 N, and heating temperature was adjusted to 160° C.

In the evaluation, one having a deformation ratio of 40% or less is taken as "A" (desirable level), and one having a ratio more than 40% is taken as "B".

In the heat resistance test 3, the step (c) under the above-described conditions was not carried out, and the composition was left for 96 hours under an atmosphere of 25° C. and a humidity of 70%. This test was conducted as a reference test. Accordingly, the results are not always required to reach the desirable levels.

<Heat Resistance Test 4>

With regard to Examples 38 to 40, a heat resistance test 4 was conducted in accordance with "heat deformation test" specified in JIS C 3005. A load was adjusted to 5 N, and heating temperature was adjusted to 160° C.

In the evaluation, one having a deformation ratio of 40% or less is taken as "A" (desirable level), and one having a ratio more than 40% is taken as "B".

In the heat resistance test 4, the step (c) under the above-described conditions was not carried out, and the composition was left for 24 hours under an atmosphere of 25° C. and a humidity of 70%. This test was conducted as a reference test. Accordingly, the results are not always required to reach the desirable levels.

TABLE 1

|  |  |  |  | Comparative Example |  |  |  | This invention |
|---|---|---|---|---|---|---|---|---|
|  |  |  |  | 1 | 2 | 3 | 4 | 1 |
| Silane MB | Base resin ($R_B$) | Resin A | UE320 | 95 |  |  |  |  |
|  |  | Resin B | SP0540 |  |  |  |  | 60 |
|  |  | Resin C | ENGAGE 7256 |  | 95 |  |  |  |
|  |  | Resin D | EV170 |  |  | 65 |  |  |
|  |  | Resin E | NUC6510 |  |  |  | 75 |  |
|  |  | Styrene elastomer | SEPTON 4077 |  |  |  | 20 |  |
|  |  | Ethylene rubber A | EPT3045 |  |  |  |  | 25 |
|  |  | Ethylene rubber B | EPT0045 |  |  | 30 |  |  |
|  |  | Non-aromatic organic oil | COSMO NEUTRAL 500 |  |  |  |  | 10 |

TABLE 1-continued

|  |  |  |  |  |  |  |  |  |
|---|---|---|---|---|---|---|---|---|
|  | Content ratio | (Non-aromatic organic oil:styrene elastomer) |  | — | — | — | — | — |
|  |  | (Non-aromatic organic oil:ethylene rubber) |  | — | — | — | — | 2:5 |
|  | Inorganic filler | Magnesium hydroxide 1 | KISUMA 5 |  |  | 100 |  | 100 |
|  |  | Magnesium hydroxide 2 | KISUMA 5L |  | 100 |  | 100 |  |
|  |  | Aluminum hydroxide | Higilite 42M | 100 |  |  |  |  |
|  |  | Calcium carbonate | SOFTON 1200 |  |  |  |  |  |
|  | Silane coupling agent | Vinyltrimethoxysilane | KBM1003 | 5 | 6.5 | 2 | 6.5 | 6.5 |
|  | Organic peroxide | Organic peroxide | Perkadox BC-FF | 0.2 | 0.1 | 0.1 | 0.3 | 0.2 |
| Catalyst | Carrier resin | Resin A | UE320 | 5 | 5 | 5 | 5 | 5 |
| MB | Silanol condensation catalyst | Silanol condensation catalyst | ADKSTAB OT-1 | 0.1 | 0.1 | 0.1 | 0.1 | 0.1 |
| Evaluation |  | Mechanical characteristics | Tensile strength | A | A | A | A | A |
|  |  |  | Tensile elongation | A | A | A | A | A |
|  |  | Heat resistance test 1 |  | A | A | A | A | A |
|  |  | Heat resistance test 2 |  | A | A | B | B | A |
|  |  | Extrusion appearance characteristics 1 of electric wire |  | A | A | A | A | A |
|  |  | Bleed characteristics of electric wire |  | A | A | A | A | A |
|  |  | Extrusion appearance characteristics 2 of electric wire |  | C | B | C | B | A |
|  |  | Extrusion appearance characteristics 3 of electric wire |  | C | C | C | C | A |

|  |  |  |  | This invention |  |  |  |  |
|---|---|---|---|---|---|---|---|---|
|  |  |  |  | 2 | 3 | 4 | 5 | 6 |
| Silane MB | Base resin ($R_B$) | Resin A | UE320 |  |  |  |  |  |
|  |  | Resin B | SP0540 | 60 | 60 | 60 | 60 | 60 |
|  |  | Resin C | ENGAGE 7256 |  |  |  |  |  |
|  |  | Resin D | EV170 |  |  |  |  |  |
|  |  | Resin E | NUC6510 |  |  |  |  |  |
|  |  | Styrene elastomer | SEPTON 4077 |  |  |  |  |  |
|  |  | Ethylene rubber A | EPT3045 | 25 | 25 | 25 | 25 | 25 |
|  |  | Ethylene rubber B | EPT0045 |  |  |  |  |  |
|  |  | Non-aromatic organic oil | COSMO NEUTRAL 500 | 10 | 10 | 10 | 10 | 10 |
|  | Content ratio | (Non-aromatic organic oil:styrene elastomer) |  | — | — | — | — | — |
|  |  | (Non-aromatic organic oil:ethylene rubber) |  | 2:5 | 2:5 | 2:5 | 2:5 | 2:5 |
|  | Inorganic filler | Magnesium hydroxide 1 | KISUMA 5 |  |  |  | 50 | 300 |
|  |  | Magnesium hydroxide 2 | KISUMA 5L | 100 |  |  |  |  |
|  |  | Aluminum hydroxide | Higilite 42M |  | 100 |  |  |  |
|  |  | Calcium carbonate | SOFTON 1200 |  |  | 100 |  |  |
|  | Silane coupling agent | Vinyltrimethoxysilane | KBM1003 | 6.5 | 6.5 | 6.5 | 6.5 | 6.5 |
|  | Organic peroxide | Organic peroxide | Perkadox BC-FF | 0.2 | 0.2 | 0.2 | 0.2 | 0.2 |
| Catalyst | Carrier resin | Resin A | UE320 | 5 | 5 | 5 | 5 | 5 |
| MB | Silanol condensation catalyst | Silanol condensation catalyst | ADKSTAB OT-1 | 0.1 | 0.1 | 0.1 | 0.1 | 0.1 |
| Evaluation |  | Mechanical characteristics | Tensile strength | A | A | A | A | A |
|  |  |  | Tensile elongation | A | A | A | A | B |
|  |  | Heat resistance test 1 |  | A | A | A | A | A |
|  |  | Heat resistance test 2 |  | A | A | A | A | A |
|  |  | Extrusion appearance characteristics 1 of electric wire |  | A | A | A | A | A |
|  |  | Bleed characteristics of electric wire |  | A | A | A | A | A |
|  |  | Extrusion appearance characteristics 2 of electric wire |  | A | A | A | A | A |
|  |  | Extrusion appearance characteristics 3 of electric wire |  | A | A | A | A | A |

|  |  |  |  | Comparative Example | This invention |  | Comparative Example |
|---|---|---|---|---|---|---|---|
|  |  |  |  | 5 | 7 | 8 | 6 |
| Silane MB | Base resin ($R_B$) | Resin A | UE320 |  |  |  |  |
|  |  | Resin B | SP0540 | 60 | 60 | 60 | 60 |
|  |  | Resin C | ENGAGE 7256 |  |  |  |  |
|  |  | Resin D | EV170 |  |  |  |  |
|  |  | Resin E | NUC6510 |  |  |  |  |
|  |  | Styrene elastomer | SEPTON 4077 |  |  |  |  |
|  |  | Ethylene rubber A | EPT3045 | 25 | 25 | 25 | 25 |
|  |  | Ethylene rubber B | EPT0045 |  |  |  |  |
|  |  | Non-aromatic organic oil | COSMO NEUTRAL 500 | 10 | 10 | 10 | 10 |
|  | Content ratio | (Non-aromatic organic oil:styrene elastomer) |  | — | — | — | — |
|  |  | (Non-aromatic organic oil:ethylene rubber) |  | 2:5 | 2:5 | 2:5 | 2:5 |
|  | Inorganic filler | Magnesium hydroxide 1 | KISUMA 5 | 100 | 100 | 100 | 100 |
|  |  | Magnesium hydroxide 2 | KISUMA 5L |  |  |  |  |
|  |  | Aluminum hydroxide | Higilite 42M |  |  |  |  |
|  |  | Calcium carbonate | SOFTON 1200 |  |  |  |  |
|  | Silane coupling agent | Vinyltrimethoxysilane | KBM1003 | 6.5 | 6.5 | 6.5 | 6.5 |
|  | Organic peroxide | Organic peroxide | Perkadox BC-FF | 0.005 | 0..05 | 0.4 | 0.9 |
| Catalyst | Carrier resin | Resin A | UE320 | 5 | 5 | 5 | 5 |
| MB | Silanol condensation catalyst | Silanol condensation catalyst | ADKSTAB OT-1 | 0.1 | 0.1 | 0.1 | 0.1 |

TABLE 1-continued

| Evaluation | Mechanical characteristics | Tensile strength | A | A | A | Extrusion was impossible |
|---|---|---|---|---|---|---|
| | | Tensile elongation | B | A | A | |
| | Heat resistance test 1 | | B | A | A | |
| | Heat resistance test 2 | | C | B | A | |
| | Extrusion appearance characteristics 1 of electric wire | | A | A | B | |
| | Bleed characteristics of electric wire | | A | A | A | |
| | Extrusion appearance characteristics 2 of electric wire | | A | A | B | |
| | Extrusion appearance characteristics 3 of electric wire | | A | A | B | |

TABLE 2

| | | | | This invention |||||||||
|---|---|---|---|---|---|---|---|---|---|---|---|
| | | | | 9 | 10 | 11 | 12 | 13 | 14 | 15 | 16 |
| Silane MB | Base resin ($R_B$) | Resin A | UE320 | | | | | | | | |
| | | Resin B | SP0540 | 70 | 55 | 45 | 50 | 70 | 65 | 60 | 50 |
| | | Resin C | ENGAGE 7256 | | | | | | | | |
| | | Resin D | EV170 | | | | | | | | |
| | | Resin E | NUC6510 | | | | | | | | |
| | | Styrene elastomer | SEPTON 4077 | 15 | 15 | 15 | 38 | | | | |
| | | Ethylene rubber A | EPT3045 | | | | | 15 | 15 | 15 | 38 |
| | | Ethylene rubber B | EPT0045 | | | | | | | | |
| | | Non-aromatic organic oil | COSMO NEUTRAL 500 | 10 | 25 | 35 | 7 | 10 | 15 | 20 | 7 |
| | Content ratio | (Non-aromatic organic oil:styrene elastomer) | | 2:3 | 5:3 | 7:3 | 7:38 | — | — | — | — |
| | | (Non-aromatic organic oil:ethylene rubber) | | — | — | — | — | 2:3 | 1:1 | 4:3 | 7:38 |
| | Inorganic filler | Magnesium hydroxide 1 | KISUMA 5 | 100 | 100 | 100 | 100 | 100 | 100 | 100 | 100 |
| | | Magnesium hydroxide 2 | KISUMA 5L | | | | | | | | |
| | | Aluminum hydroxide | Higilite 42M | | | | | | | | |
| | | Calcium carbonate | SOFTON 1200 | | | | | | | | |
| | Silane coupling agent | Vinyltrimethoxysilane | KBM1003 | 6.5 | 6.5 | 6.5 | 6.5 | 6.5 | 6.5 | 6.5 | 6.5 |
| | Organic peroxide | Organic peroxide | Perkadox BC-FF | 0.2 | 0.2 | 0.2 | 0.2 | 0.2 | 0.2 | 0.2 | 0.2 |
| Catalyst MB | Carrier resin | Resin A | UE320 | 5 | 5 | 5 | 5 | 5 | 5 | 5 | 5 |
| | Silanol condensation catalyst | Silanol condensation catalyst | ADKSTAB OT-1 | 0.1 | 0.1 | 0.1 | 0.1 | 0.1 | 0.1 | 0.1 | 0.1 |
| Evaluation | Mechanical characteristics | Tensile strength | | A | A | A | A | A | A | A | A |
| | | Tensile elongation | | A | A | A | A | A | A | A | A |
| | Heat resistance test 1 | | | A | A | A | A | A | A | A | A |
| | Heat resistance test 2 | | | A | A | A | A | A | A | A | A |
| | Extrusion appearance characteristics 1 of electric wire | | | A | A | A | A | A | A | A | A |
| | Bleed characteristics of electric wire | | | A | A | B | A | A | A | B | A |
| | Extrusion appearance characteristics 2 of electric wire | | | A | A | A | A | A | A | A | A |
| | Extrusion appearance characteristics 3 of electric wire | | | A | A | A | B | A | A | A | B |

| | | | | This invention |||||||||
|---|---|---|---|---|---|---|---|---|---|---|---|
| | | | | 17 | 18 | 19 | 20 | 21 | 22 | 23 | 24 |
| Silane MB | Base resin ($R_B$) | Resin A | UE320 | | | | | | | | |
| | | Resin B | SP0540 | 70 | 65 | 60 | 50 | 70 | 65 | 50 | 50 |
| | | Resin C | ENGAGE 7256 | | | | | | | | |
| | | Resin D | EV170 | | | | | | | | |
| | | Resin E | NUC6510 | | | | | | | | |
| | | Styrene elastomer | SEPTON 4077 | | | | | 7.5 | 7.5 | 7.5 | 19 |
| | | Ethylene rubber A | EPT3045 | | | | | 7.5 | 7.5 | 7.5 | 19 |
| | | Ethylene rubber B | EPT0045 | 15 | 15 | 15 | 38 | | | | |
| | | Non-aromatic organic oil | COSMO NEUTRAL 500 | 10 | 15 | 20 | 7 | 10 | 15 | 30 | 7 |
| | Content ratio | (Non-aromatic organic oil:styrene elastomer) | | — | — | — | — | 4:3 | 2:1 | 4:1 | 7:19 |
| | | (Non-aromatic organic oil:ethylene rubber) | | 2:3 | 1:1 | 4:3 | 7:38 | 4:3 | 2:1 | 4:1 | 7:19 |
| | Inorganic filler | Magnesium hydroxide 1 | KISUMA 5 | 100 | 100 | 100 | 100 | 100 | 100 | 100 | 100 |
| | | Magnesium hydroxide 2 | KISUMA 5L | | | | | | | | |
| | | Aluminum hydroxide | Higilite 42M | | | | | | | | |
| | | Calcium carbonate | SOFTON 1200 | | | | | | | | |
| | Silane coupling agent | Vinyltrimethoxysilane | KBM1003 | 6.5 | 6.5 | 6.5 | 6.5 | 6.5 | 6.5 | 6.5 | 6.5 |
| | Organic peroxide | Organic peroxide | Perkadox BC-FF | 0.2 | 0.2 | 0.2 | 0.2 | 0.2 | 0.2 | 0.2 | 0.2 |
| Catalyst MB | Carrier resin | Resin A | UE320 | 5 | 5 | 5 | 5 | 5 | 5 | 5 | 5 |
| | Silanol condensation catalyst | Silanol condensation catalyst | ADKSTAB OT-1 | 0.1 | 0.1 | 0.1 | 0.1 | 0.1 | 0.1 | 0.1 | 0.1 |
| Evaluation | Mechanical characteristics | Tensile strength | | A | A | A | A | A | A | A | A |
| | | Tensile elongation | | A | A | A | A | A | A | A | A |
| | Heat resistance test 1 | | | A | A | A | A | A | A | A | A |
| | Heat resistance test 2 | | | A | A | A | A | A | A | A | A |
| | Extrusion appearance characteristics 1 of electric wire | | | A | A | A | A | A | A | A | A |
| | Bleed characteristics of electric wire | | | A | A | B | A | A | A | B | A |
| | Extrusion appearance characteristics 2 of electric wire | | | A | A | A | A | A | A | A | A |
| | Extrusion appearance characteristics 3 of electric wire | | | A | A | A | B | A | A | A | B |

TABLE 3

|  |  |  |  | This invention | | | Comparative Example |
|---|---|---|---|---|---|---|---|
|  |  |  |  | 25 | 26 | 27 | 7 |
| Silane MB | Base resin ($R_B$) | Resin A | UE320 |  |  |  |  |
|  |  | Resin B | SP0540 | 65 | 65 | 65 | 65 |
|  |  | Resin C | ENGAGE 7256 |  |  |  |  |
|  |  | Resin D | EV170 |  |  |  |  |
|  |  | Resin E | NUC6510 |  |  |  |  |
|  |  | Styrene elastomer | SEPTON 4077 | 7.5 | 7.5 | 7.5 | 7.5 |
|  |  | Ethylene rubber A | EPT3045 | 7.5 | 7.5 | 7.5 | 7.5 |
|  |  | Ethylene rubber B | EPT0045 |  |  |  |  |
|  |  | Non-aromatic organic oil | COSMO NEUTRAL 500 | 15 | 15 | 15 | 15 |
|  | Content ratio | (Non-aromatic organic oil:styrene elastomer) |  | 2:1 | 2:1 | 2:1 | 2:1 |
|  |  | (Non-aromatic organic oil:ethylene rubber) |  | 2:1 | 2:1 | 2:1 | 2:1 |
|  | Inorganic filler | Magnesium hydroxide 1 | KISUMA 5 | 100 | 100 | 100 | 100 |
|  |  | Magnesium hydroxide 2 | KISUMA 5L |  |  |  |  |
|  |  | Aluminum hydroxide | Higilite 42M |  |  |  |  |
|  |  | Calcium carbonate | SOFTON 1200 |  |  |  |  |
|  | Silane coupling agent | Vinyltrimethoxysilane | KBM1003 | 3 | 5 | 12 | 25 |
|  | Organic peroxide | Organic peroxide | Perkadox BC-FF | 0.2 | 0.2 | 0.2 | 0.2 |
| Catalyst MB | Carrier resin | Resin A | UE320 | 5 | 5 | 5 | 5 |
|  | Silanol condensation catalyst | Silanol condensation catalyst | ADKSTAB OT-1 | 0.1 | 0.1 | 0.1 | 0.1 |
| Evaluation |  | Mechanical characteristics | Tensile strength | A | A | A | A |
|  |  |  | Tensile elongation | A | A | A | A |
|  |  | Heat resistance test 1 |  | A | A | A | A |
|  |  | Heat resistance test 2 |  | A | A | A | B |
|  |  | Extrusion appearance characteristics 1 of electric wire |  | A | A | A | C |
|  |  | Bleed characteristics of electric wire |  | A | A | B | B |
|  |  | Extrusion appearance characteristics 2 of electric wire |  | B | A | A | C |
|  |  | Extrusion appearance characteristics 3 of electric wire |  | B | B | A | C |

|  |  |  |  | This invention | | | Comparative Example |
|---|---|---|---|---|---|---|---|
|  |  |  |  | 28 | 29 | 30 | 8 |
| Silane MB | Base resin ($R_B$) | Resin A | UE320 |  |  |  |  |
|  |  | Resin B | SP0540 |  |  |  |  |
|  |  | Resin C | ENGAGE 7256 | 89 | 85 | 65 | 45 |
|  |  | Resin D | EV170 |  |  |  |  |
|  |  | Resin E | NUC6510 |  |  |  |  |
|  |  | Styrene elastomer | SEPTON 4077 |  |  |  |  |
|  |  | Ethylene rubber A | EPT3045 |  |  |  |  |
|  |  | Ethylene rubber B | EPT0045 |  |  |  |  |
|  |  | Non-aromatic organic oil | COSMO NEUTRAL 500 | 6 | 10 | 30 | 50 |
|  | Content ratio | (Non-aromatic organic oil:styrene elastomer) |  | — | — | — | — |
|  |  | (Non-aromatic organic oil:ethylene rubber) |  | — | — | — | — |
|  | Inorganic filler | Magnesium hydroxide 1 | KISUMA 5 | 100 | 100 | 100 | 100 |
|  |  | Magnesium hydroxide 2 | KISUMA 5L |  |  |  |  |
|  |  | Aluminum hydroxide | Higilite 42M |  |  |  |  |
|  |  | Calcium carbonate | SOFTON 1200 |  |  |  |  |
|  | Silane coupling agent | Vinyltrimethoxysilane | KBM1003 | 6.5 | 6.5 | 6.5 | 6.5 |
|  | Organic peroxide | Organic peroxide | Perkadox BC-FF | 0.2 | 0.2 | 0.2 | 0.2 |
| Catalyst MB | Carrier resin | Resin A | UE320 | 5 | 5 | 5 | 5 |
|  | Silanol condensation catalyst | Silanol condensation catalyst | ADKSTAB OT-1 | 0.1 | 0.1 | 0.1 | 0.1 |
| Evaluation |  | Mechanical characteristics | Tensile strength | A | A | A | B |
|  |  |  | Tensile elongation | A | A | A | A |
|  |  | Heat resistance test 1 |  | A | A | A | B |
|  |  | Heat resistance test 2 |  | A | A | A | C |
|  |  | Extrusion appearance characteristics 1 of electric wire |  | A | A | A | A |
|  |  | Bleed characteristics of electric wire |  | C | C | C | C |
|  |  | Extrusion appearance characteristics 2 of electric wire |  | B | A | A | A |
|  |  | Extrusion appearance characteristics 3 of electric wire |  | B | A | A | A |

|  |  |  |  | This invention | | | | | | |
|---|---|---|---|---|---|---|---|---|---|---|
|  |  |  |  | 31 | 32 | 33 | 34 | 35 | 36 | 37 |
| Silane MB | Base resin ($R_B$) | Resin A | UE320 | 55 |  |  |  |  |  |  |
|  |  | Resin B | SP0540 |  | 55 |  |  |  |  |  |
|  |  | Resin C | ENGAGE 7256 |  |  | 55 |  |  | 20 | 35 |
|  |  | Resin D | EV170 |  |  |  | 55 |  |  |  |
|  |  | Resin E | NUC6510 |  |  |  |  | 55 |  |  |
|  |  | Styrene elastomer | SEPTON 4077 |  |  |  |  |  | 45 | 35 |

TABLE 3-continued

|  |  |  |  |  |  |  |  |  |  |
|---|---|---|---|---|---|---|---|---|---|
|  |  | Ethylene rubber A | EPT3045 | 25 | 25 | 25 | 25 | 25 |  |  |
|  |  | Ethylene rubber B | EPT0045 |  |  |  |  |  |  |  |
|  |  | Non-aromatic organic oil | COSMO NEUTRAL 500 | 15 | 15 | 15 | 15 | 15 | 30 | 25 |
|  | Content ratio | (Non-aromatic organic oil:styrene elastomer) |  | — | — | — | — | — | 6:9 | 5:7 |
|  |  | (Non-aromatic organic oil:ethylene rubber) |  | 3:5 | 3:5 | 3:5 | 3:5 | 3:5 | — | — |
|  | Inorganic filler | Magnesium hydroxide 1 | KISUMA 5 | 100 | 100 | 100 | 100 | 100 | 100 | 100 |
|  |  | Magnesium hydroxide 2 | KISUMA 5L |  |  |  |  |  |  |  |
|  |  | Aluminum hydroxide | Higilite 42M |  |  |  |  |  |  |  |
|  |  | Calcium carbonate | SOFTON 1200 |  |  |  |  |  |  |  |
|  | Silane coupling agent | Vinyltrimethoxysilane | KBM1003 | 6.5 | 6.5 | 6.5 | 6.5 | 6.5 | 6.5 | 6.5 |
|  | Organic peroxide | Organic peroxide | Perkadox BC-FF | 0.2 | 0.2 | 0.2 | 0.2 | 0.2 | 0.4 | 0.2 |
| Catalyst MB | Carrier resin | Resin A | UE320 | 5 | 5 | 5 | 5 | 5 | 5 | 5 |
|  | Silanol condensation catalyst | Silanol condensation catalyst | ADKSTAB OT-1 | 0.1 | 0.1 | 0.1 | 0.1 | 0.1 | 0.1 | 0.1 |
| Evaluation | Mechanical characteristics | Tensile strength |  | A | A | A | A | A | A | A |
|  |  | Tensile elongation |  | A | A | A | A | A | A | A |
|  | Heat resistance test 1 |  |  | A | A | A | A | A | A | A |
|  | Heat resistance test 2 |  |  | B | A | A | B | B | B | A |
|  | Extrusion appearance characteristics 1 of electric wire |  |  | A | A | A | A | A | B | A |
|  | Bleed characteristics of electric wire |  |  | A | A | A | A | A | A | A |
|  | Extrusion appearance characteristics 2 of electric wire |  |  | A | A | A | A | A | B | A |
|  | Extrusion appearance characteristics 3 of electric wire |  |  | A | A | A | A | A | B | A |

TABLE 4

|  |  |  |  | This invention ||||||
|---|---|---|---|---|---|---|---|---|---|
|  |  |  |  | 38 | 39 | 40 | 41 | 42 | 43 |
| Silane MB | Base resin ($R_B$) | Resin A | UE320 |  |  |  |  |  |  |
|  |  | Resin B | SP0540 | 60 | 60 | 60 | 60 | 60 | 60 |
|  |  | Resin C | ENGAGE 7256 |  |  |  |  |  |  |
|  |  | Resin D | EV170 |  |  |  |  |  |  |
|  |  | Resin E | NUC6510 |  |  |  |  |  |  |
|  |  | Styrene elastomer | SEPTON 4077 |  |  |  |  |  |  |
|  |  | Ethylene rubber A | EPT3045 | 25 | 25 | 25 | 25 | 25 | 25 |
|  |  | Ethylene rubber B | EPT0045 |  |  |  |  |  |  |
|  |  | Non-aromatic organic oil | COSMO NEUTRAL 500 | 10 | 10 | 10 | 10 | 10 | 10 |
|  | Content ratio | (Non-aromatic organic oil:styrene elastomer) |  | — | — | — | — | — | — |
|  |  | (Non-aromatic organic oil:ethylene rubber) |  | 2:5 | 2:5 | 2:5 | 2:5 | 2:5 | 2:5 |
|  | Inorganic filler | Magnesium hydroxide 1 | KISUMA 5 | 100 | 100 | 100 | 100 | 100 | 100 |
|  |  | Magnesium hydroxide 2 | KISUMA 5L |  |  |  |  |  |  |
|  |  | Aluminum hydroxide | Higilite 42M |  |  |  |  |  |  |
|  |  | Calcium carbonate | SOFTON 1200 |  |  |  |  |  |  |
|  | Silane coupling agent | Vinyltrimethoxysilane | KBM1003 | 6.5 | 6.5 | 6.5 | 6.5 | 6.5 | 6.5 |
|  | Organic peroxide | Organic peroxide | Perkadox BC-FF | 0.2 | 0.2 | 0.2 | 0.2 | 0.2 | 0.2 |
| Catalyst MB | Carrier resin | Resin A | UE320 | 5 | 5 | 5 | 5 | 5 | 5 |
|  | Silanol condensation catalyst | Silanol condensation catalyst | ADKSTAB OT-1 | 0.05 | 0.13 | 0.4 | 0.1 | 0.1 | 0.1 |
| Evaluation | Mechanical characteristics | Tensile strength |  | A | A | A | A | A | A |
|  |  | Tensile elongation |  | A | A | A | A | A | A |
|  | Heat resistance test 1 |  |  | A | A | A | A | A | A |
|  | Heat resistance test 2 |  |  | A | A | A | A | A | A |
|  | Extrusion appearance characteristics 1 of electric wire |  |  | A | A | A | A | A | A |
|  | Bleed characteristics of electric wire |  |  | A | A | A | A | A | A |
|  | Extrusion appearance characteristics 2 of electric wire |  |  | A | A | B | A | A | A |
|  | Extrusion appearance characteristics 3 of electric wire |  |  | A | A | B | A | A | A |
|  | Heat resistance test 3 |  |  | A | A | A |  |  |  |
|  | Heat resistance test 4 |  |  | B | A | A |  |  |  |

As is clear from the results in Table 1 to Table 4, in all of Examples 1 to 43, the electric wires passed the extrusion appearance characteristics 2 and the extrusion appearance characteristics 3, and it was possible to produce electric wires having excellent appearance even under conditions in which the aggregated substance was easily generated. In addition, in all of Examples 1 to 43, it was possible to produce electric wires that also passed the mechanical characteristics and the heat resistance.

Further, as is clear from the results in Table 4, even when no warm water treatment or the like was applied in the step (c), and the content of the silanol condensation catalyst was changed to 0.05 to 0.4 parts by mass with respect to 100 parts by mass of the base resin ($R_B$), the electric wires that passed each test of the appearance, the mechanical characteristics, and the heat resistance, and also the heat resistant test 3, and further the heat resistant test 4, and had excellent heat resistance were able to be produced.

Thus, the heat-resistant silane crosslinked resin molded bodies provided as the coatings of the electric wires in Examples 1 to 43 in the present invention had the excellent appearance even when the molded bodies were produced under the conditions in which the aggregated substance was easily generated. Furthermore, the molded bodies were excellent also in the mechanical characteristics and the heat resistance. It can be easily understood that the flame retardancy is excellent from the mixing amount of the inorganic filler.

In contrast, in all of Comparative Examples 1 to 4 in which the base resin ($R_B$) containing no non-aromatic organic oil was used, the electric wires failed in the extrusion appearance characteristics 2 and the extrusion appearance characteristics 3, although the electric wires passed the extrusion appearance test 1. On the other hand, in Comparative Example 8 in which the content of the non-aromatic organic oil was high, the electric wire failed in the heat resistance tests 1 and 2.

In addition, in Comparative Example 5 in which the ratio of using the organic peroxide was low, the electric wire failed in the heat resistance tests 1 and 2, and in Comparative Example 6 in which the ratio of using the organic peroxide was high, even extrusion molding was unable to be made.

Further, in Comparative Example 7 in which the content of the silane coupling agent was high, the electric wire did not pass even the extrusion appearance test 1, and failed also in the hot set test 1, and also had poor heat resistance.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of producing a heat-resistant silane crosslinked resin molded body, comprising:
   (a) a step of obtaining a mixture by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from more than 4 parts by mass to 15.0 parts by mass, and a silanol condensation catalyst,
   (b) a step of obtaining a molded body by molding the mixture, and
   (c) a step of obtaining a heat-resistant silane crosslinked resin molded body by contacting the molded body with water,
   wherein the step (a) has a step (1) and a step (3) below, and when part of the base resin ($R_B$) is melt-mixed in the step (1), the step (a) has the step (1), a step (2), and the step (3) below:
   Step (1): a step of melt-mixing all or part of the base resin ($R_B$), the organic peroxide, the inorganic filler, and the silane coupling agent, at a temperature equal to or higher than the decomposition temperature of the organic peroxide, to prepare a silane master batch,
   Step (2): a step of melt-mixing a remainder of the base resin ($R_B$) and the silanol condensation catalyst, to prepare a catalyst master batch, and
   Step (3): a step of mixing the silane master batch and either the silanol condensation catalyst or the catalyst master batch, and
   wherein the base resin ($R_B$) contains an ethylene-propylene-unconjugated diene rubber.

2. The method of producing a heat-resistant silane crosslinked resin molded body according to claim 1, wherein the base resin ($R_B$) contains 5 to 40 mass % of a styrene-based elastomer, and a mass ratio of the content of the non-aromatic organic oil to the content of the styrene-based elastomer is from 1:5 to 2:1.

3. A heat-resistant silane crosslinked resin molded body produced by the method according to claim 1.

4. A heat-resistant product having the heat-resistant silane crosslinked resin molded body according to claim 3.

5. The heat-resistant product according to claim 4, wherein the heat-resistant silane crosslinked resin molded body is provided as a coating for an electric wire or an optical fiber cable.

6. A method of producing a heat-resistant silane crosslinkable resin composition, comprising:
   (a) a step of obtaining a mixture by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from more than 4 parts by mass to 15.0 parts by mass, and a silanol condensation catalyst,
   wherein the step (a) has a step (1) and a step (3) below, and when part of the base resin ($R_B$) is melt-mixed in the step (1), the step (a) has the step (1), a step (2), and the step (3) below:
   Step (1): a step of melt-mixing all or part of the base resin ($R_B$), the organic peroxide, the inorganic filler, and the silane coupling agent, at a temperature equal to or higher than the decomposition temperature of the organic peroxide, to prepare a silane master batch,
   Step (2); a step of melt-mixing a remainder of the base resin ($R_B$) and the silanol condensation catalyst, to prepare a catalyst master batch, and
   Step (3): a step of mixing the silane master batch and either the silanol condensation catalyst or the catalyst master batch, and
   wherein the base resin ($R_B$) contains an ethylene-propylene-unconjugated diene rubber.

7. The method of producing a heat-resistant silane crosslinkable resin composition according to claim 6, wherein the amount of the silanol condensation catalyst is from 0.05 to 0.5 parts by mass, with respect to 100 parts by mass of the base resin ($R_B$).

8. A heat-resistant silane crosslinkable resin composition produced by the method according to claim 6.

9. A silane master batch, for use in a production of a heat-resistant silane crosslinkable resin composition formed by melt-mixing, to 100 parts by mass of a base resin ($R_B$) containing a non-aromatic organic oil of from 5 to 40 mass %, an organic peroxide of from 0.01 to 0.6 parts by mass, an inorganic filler of from 10 to 400 parts by mass, a silane coupling agent of from more than 4 parts by mass to 15.0 parts by mass, and a silanol condensation catalyst,
   wherein all or part of the base resin ($R_B$), the organic peroxide, the inorganic filler, and the silane coupling agent are melt-mixed, at a temperature equal to or higher than the decomposition temperature of the organic peroxide, and
   wherein the base resin ($R_B$) contains an ethylene-propylene-unconjugated diene rubber.

* * * * *